US007941136B2

(12) United States Patent   (10) Patent No.: US 7,941,136 B2
Reed et al.   (45) Date of Patent: May 10, 2011

(54) MOBILE PHONE NETWORK OPTIMISATION SYSTEMS

(75) Inventors: Keith Reed, London (GB); Chris Haines, London (GB)

(73) Assignee: Actix Limited (GB)

( * ) Notice: Subject to any disclaimer, the term of this patent is extended or adjusted under 35 U.S.C. 154(b) by 330 days.

(21) Appl. No.: 12/140,091

(22) Filed: Jun. 16, 2008

(65) Prior Publication Data

US 2009/0075648 A1   Mar. 19, 2009

Related U.S. Application Data

(63) Continuation-in-part of application No. 11/871,732, filed on Oct. 12, 2007.

(30) Foreign Application Priority Data

Sep. 14, 2007 (GB) .................................. 0717904.7
May 19, 2008 (GB) .................................. 0809056.5

(51) Int. Cl.
   *H04Q 7/20* (2006.01)
(52) U.S. Cl. .......................... 455/424; 455/423; 455/445
(58) Field of Classification Search ........................ None
   See application file for complete search history.

(56) References Cited

U.S. PATENT DOCUMENTS

| | | | |
|---|---|---|---|
| 6,118,936 | A | 9/2000 | Lauer |
| 6,829,491 | B1 | 12/2004 | Yea et al. |
| 7,353,160 | B2 | 4/2008 | Voigt |
| 7,653,395 | B2 | 1/2010 | Joachim |
| 2004/0266442 | A1 * | 12/2004 | Flanagan et al. .............. 455/445 |
| 2006/0141947 | A1 | 6/2006 | Samuelsson |
| 2006/0227754 | A1 | 10/2006 | Ko |
| 2006/0235674 | A1 | 10/2006 | Voigt |
| 2007/0254644 | A1 | 11/2007 | Dobson et al. |
| 2007/0280123 | A1 | 12/2007 | Atkins et al. |
| 2007/0291757 | A1 | 12/2007 | Dobson et al. |
| 2008/0004035 | A1 | 1/2008 | Atkins et al. |

(Continued)

FOREIGN PATENT DOCUMENTS

WO   WO-00/11884 A1   3/2000

(Continued)

OTHER PUBLICATIONS

"International Application Serial No. PCT/GB2008/050751, International Search Report mailed Feb. 9, 2009", 3 pgs.

(Continued)

*Primary Examiner* — Phuoc Doan
(74) *Attorney, Agent, or Firm* — Schwegman, Lundberg & Woessner, P.A.

(57) ABSTRACT

We describe a system to optimize performance of a mobile phone network towards a performance goal. The system receives performance data comprising aggregated data for a plurality of calls and commissions measurement data comprising data logged for a plurality of mobile phones, and outputs data for changing a configuration of said network. The system includes a performance monitoring system; a measurement data request system, wherein measurement data is selectively commissioned in response said performance mismatch; a measurement data analysis system to analyze the commissioned measurement data to determine a probable cause of said mismatch, and to provide analysis data identifying the probable cause; and an action determination system to receive said analysis data and to output action data dependent on the analysis data, the action data identifying one or more configuration changes to be made to the mobile phone network to reduce the mismatch.

12 Claims, 21 Drawing Sheets

U.S. PATENT DOCUMENTS

2008/0020731 A1* 1/2008 Kim et al. .................... 455/407
2009/0075655 A1 3/2009 Dobson et al.

FOREIGN PATENT DOCUMENTS

| WO | WO-03/055251 | A1 | 7/2003 |
| WO | WO-2004/075050 | A2 | 9/2004 |
| WO | WO-2004/084571 | A1 | 9/2004 |
| WO | WO-2005/034551 | A1 | 4/2005 |
| WO | WO-2005/071890 | A1 | 8/2005 |
| WO | WO-2005/086418 | A1 | 9/2005 |
| WO | WO-2006118539 | A2 | 11/2006 |
| WO | WO-2007006229 | A1 | 1/2007 |

OTHER PUBLICATIONS

"International Application Serial No. PCT/GB2008/050751, Written Opinion mailed Feb. 9, 2009", 5 pgs.
"Great Britain Patent Application No. GB0717904.7, Search Report dated Jan. 12, 2008", 1 pg.
"U.S. Appl. No. 11/871,732 Non-Final Office Action mailed Aug. 27, 2010", 13.

* cited by examiner

MOBILE PHONE NETWORK OPTIMISATION SYSTEMS

RELATED APPLICATIONS

This application is a continuation-in-part of U.S. patent application Ser. No. 11/871,732, filed Oct. 12, 2007, which application claims priority under 35 U.S.C. 119 to United Kingdom Application No. 0717904.7, filed Sep. 14, 2007, and to United Kingdom Application No. 0809056.5, filed May 19, 2008, which applications are incorporated herein by reference and made a part hereof.

FIELD OF THE INVENTION

This invention relates to systems and methods for managing and optimizing mobile phone networks.

BACKGROUND TO THE INVENTION

Typically network operations have a variety of hardware and software systems for managing their networks. For example, they have systems for billing, planning and configuring the network, configuring neighbour lists, measuring and managing performance, for triggering alarms and raising and managing trouble tickets. The data from all of these systems is usually stored in separate databases (sometimes with separate databases of each type for every region or administrative area) with little or no communication between them. This makes it hard for engineers to manage changes network performance. For example network operators would currently have difficulty associating a sudden rise in dropped calls with a change in the serving sector's antenna configuration that caused it.

Consequently in the course of their daily work, radio engineers usually use a multitude of different tools, each of which is limited to solving a specific problem. For example, an engineer when performing a routine daily investigation into base stations that have a high handover failure rate typically follows multiple manual steps, some of which are paper-based, and uses a variety of different tools. This is inefficient, error prone, and time consuming and does not facilitate the sharing of information and data between different engineers and teams.

More generally, it is desirable to be able to correct problems reported at a relatively high level within a mobile phone network, for example from an OMC (Operation and Maintenance Centre) with reasons for the problems, which typically stem from a much lower level, typically the radio subsystem. One difficulty, however, is the vast quantities of data which the radio subsystem generates. It is further desirable to extend this concept from solving problems to optimizing performance of a mobile phone network, preferably automatically.

SUMMARY OF THE INVENTION

According to the present invention there is therefore provided a mobile phone network optimization system to control at least part of a mobile phone network in response to performance data from said mobile phone network to optimize performance of the mobile phone network towards a performance goal, the system comprising: a first interface to receive said performance data from said mobile phone network, said performance data comprising aggregated data for a plurality of calls; a second interface to commission measurement data from said mobile phone network and to receive said commissioned measurement data, said measurement data comprising data logged for a plurality of mobile phones of said network; a third interface to provide configuration data to said mobile phone network for changing a configuration of said network; a performance monitoring system coupled to said first interface to identify a mismatch between said performance goal and performance of said mobile phone network represented by said performance data, and to provide mismatch identification data for said mismatch responsive to said identification; a measurement data request system coupled to said second interface to commission a set of said measurement data from said mobile phone network, wherein said measurement data is selectively commissioned response to said mismatch identification data; a measurement data analysis system to receive and analyze said commissioned measurement data, to determine a probable cause of said mismatch, and to provide analysis data identifying said probable cause; and an action determination system coupled to said third interface to receive said analysis data and to output to said third interface action data dependent on said analysis data, said action data identifying one or more configuration changes to be made to said mobile phone network to reduce said mismatch.

In embodiments the optimization system couples together and co-ordinates the number of separate components so that once a performance mismatch or problem has been identified appropriate measurement data for diagnosing the problem/improving performance is collected and then processed to determine an appropriate action to be taken in response. Some of the interfaces may be shared, for example on the same physical interface; others may be distributed, for example the second interface commissioning measurement data via a first connection to the network and receiving measurement data from a second connection to the network. Some of the interfaces, for example the second interface, may comprise multiple logical interfaces.

The skilled person will understand that a mobile phone network is used for data as well as voice transmission, and that mobile devices connected to the network may include mobile phones (generally with voice and data capability) and data-only mobile devices, for example for connecting a computer to the network, and other types of mobile device.

In embodiments the performance monitoring system and the measurement data request system each comprise a rules engine preferably a single, shared rules engine able both to identify a said mismatch and to identify measurement data for commissioning to diagnose the mismatch (as described below, the Nexus™ rules engine). Thus in some preferred embodiments the mismatch identification data is internal to the rules engine and comprises the result(s) of applying one or more rules, used by one or more further rules which identify which further information is to be collected, selectively commissioned for diagnosing the mismatch. The commissioning of the measurement data may be implemented by a further system interfacing to one or more appropriate interfaces of the mobile phone network, and therefore the measurement data request system need not be directly coupled to the second interface.

Preferably the system includes a controller to provide closed-loop control of configuration changes to the network, preferably automatically, preferably in real time. Thus for example the controller may determine whether optimizing one parameter or group of parameters or correcting one fault has caused a deterioration or fault in another part of the network. To make this determination the controller may control the optimization system to check the performance of neighbouring cells to those immediately affected by the configuration changes and/or to neighbours' neighbours of cells directly affected by the configuration changes. If an overall fall in performance is detected then one or more further configuration changes may be made (which in simple embodiments may simply reverse the original configuration change(s)). In some preferred implementations the system is able to test a plurality of configuration changes and determine which is optimum, that is which best reduces the mismatch without significantly deleteriously affecting the performance of other parts of the network.

In some preferred embodiments the measurement data request (commission) to the mobile phone network comprises one or more of: data identifying parameters to measure, a location or locations within the network to which the measurement data is to relate, and information defining a number of mobile phones to which the measurement data is to relate (this latter data may be implicit and/or defined by an upper or lower limit or a range). The commissioned set of measurement data returned form the network comprises the parameter(s) for the location (or interface), optionally for each mobile phone. In embodiments the measurement data comprises switch-based measurements files, in particular (super) calltrace data, for example in UMTS networks GPEH (General Performance Event Handling) data, RRPTM/RTT data (Alcatel) or ICSU data (Nokia) or similar types of data relating to other hardware manufacturers; for GSM networks R-PMO data (Ericsson) or NMS 2000 data (Nokia); for CDMA networks SBS data (Nortel), CDL data (Motorola) or PCMD data (Lucent), or again similar data relating to other hardware. It may also include aggregate measurement data, for example for UMTS, SCA data (Siemens), CPT data (Nortel), DAC/UAC data (Huawei) or CF/DAC data (Nokia); for GSM RMS31 data (Alcatel), SCA data Siemens, NCS, MRR data (Ericsson), CPT data (Nortel), DAC/UAC data (Huawei), CF/DAC data (Nokia) or MoBis logs (Motorola); as well as similar data relating to other hardware.

Broadly speaking the measurement data commissioned from the network comprises radio subsystem level data, for example data relating to the air interface. This preferably provides real-time monitoring, for example by instrumentation code which collects data from RNCs (Radio Network Controllers) or BSCs (Base Station Controllers). This data may be logged for a plurality of mobiles separately, rather than aggregated. The measurement data may comprise internal message data, that is messages between modules within a single network element such as an RNC and/or external messages, that is messages between an RNC (or corresponding network element) and other lower or higher level network elements, for example a NodeB, MSC (Mobile Switching Centre) or, at a lower level a base station or UE (User Equipment).

In embodiments the measurement data is collected at discrete time intervals, for example at intervals equal to or greater than 5, 10, 15, 30 or 60 minutes; this assists in achieving stability in the system where there is automatic control. Again for stability, in embodiments the configuration changes may be limited to just a part of the network, for example to not more than an upper limit number of cells for example 10 cells (and/or sectors and/or base stations and/or BSCs/RNCs) or greater than a geographical area; this is advantageous for stability in a cell-optimizing or organizing network.

In general the performance goal will be defined in terms of a desired technical performance of the network; in the industry there are many of these, generally referred to as KPIs (Key Performance Indicators). For example, one KPI might be a maximum page impression time for O2® iPhone® users or, more likely, a requirement on a maximum tolerable number of occurrences of an average page impression time taking longer than a set duration target. Another KPI may include, for example, a maximum dropped call rate.

There may be separate goals for different types of traffic, for example voice calls, video calls, packet sessions, multi RAB calls and the like. In this specification references to calls include voice calls, video calls, packet sessions, multi RAB calls and the like. A performance goal may be mapped to performance data and/or performance alerts derived from OMC counters for other performance information, as described above. In embodiments determination of a mismatch between a performance goal and performance of the network represented by the performance data may include a degree of hysteresis, in particular when repeatedly changing configuration of part of the network, for example in a closed-loop or self-optimizing network, again for increased stability.

In a mobile phone network there may be many KPIs and corresponding performance goals mapping to performance measurement data. However there is a need for the ability to automatically optimize a network in accordance with higher level, business driven goals, typically revenue-related. Such business level goals may include goals relating to service management and operations, resource management and operations and customer relationship management (for example to prioritize high value customers). It would therefore be desirable to be able to provide global control of a network or part of a network in order to set one or more such business goals, allowing the mobile phone network optimization system automatically to configure the many thousands of low level parameters in the network accordingly. For example a single control could be provided to set the relative priority of two different types of traffic, say voice and data, for a particular part of the network and/or group of subscribers, say iPhones®.

In some preferred embodiments, therefore, the system includes a network controller user interface to enable a human controller to define one or more network management goals mapping to a set of performance goals. The above-described network optimization system is then able to shift performance of the network towards the network management goal by optimizing towards the plurality of performance goals, either sequentially or in parallel. The mapping of a network management goal to a set of performance goals may be performed manually and stored as mapping data, or automatically based on a knowledge of which KPIs are relatively most important for particular network management goals, such as traffic priorities and the like. Optionally where optimization of a network towards multiple simultaneous performance goals is desired each of these performance goals may be provided with a tolerance (or an increased tolerance) to assist in achieving a solution (in embodiments the tolerance may be increased responsive to success or lack of success of the optimization, for example in the number of iterations around an above-described closed-loop). In particular in such a system a configuration change to the network to reduce the mismatch may comprise an increase in the physical network infrastructure, such as adding more base stations (i.e. investment in the network) or a reduction in the physical network infrastructure, for example reducing the number of transceivers in a particular base station or set of base stations (disinvestment in the network infrastructure).

In this way network management goals such as sales-related goals (for example coverage, service quality, say by a geographical region) may be included and balanced against financial goals either for the network as a whole or for example by a geographical region; and/or a network management goal may be defined in terms of performance of a competing operator. In this latter case the network management goal may comprise performance data obtained at a user-level in the competing network, for example by drive testing.

In, say, a 3G mobile phone network a hardware element may have many hundreds of adjustable parameters. Typically when a new item of a hardware is installed in a network the only parameters which are set are those which are required to configure the device according to its installation. The skilled person will understand that parameters, generally preset by a manufacturer, which can be optimized for better performance include: neighbour lists, buffer lengths/overflow parameters, handover (handoff) hysteresis, and values of timers. Timer values can be particularly important—each device in a chain may have its own timeout timer which should be set to be sufficiently long to allow for delay within the entire chain, but problems can arise when timers in devices/modules of a chain are de-synchronized. Other examples of network configuration parameters include antenna-related parameters such as azimuth, height, 2D position, antenna type, power and the like; some of these may be remotely controllable, others are often set manually. In a 4G system there are many more cells and base stations and, accordingly, more parameters.

In embodiments of the optimization system the third interface comprises an interface which enables the mobile phone network configuration to be changed without manual intervention, at least in respect of a majority of the configuration parameters (some antenna configurations may require manual intervention as will, in general, other physical modifications to the network such as the addition of base stations/transceivers). Nonetheless some preferred embodiments of the system are configured to automatically optimize at least part of the network by reducing mismatch to the performance goal and/or by automatically correcting a fault in the network (where the mismatch defines a fault identified, to a degree of probability, by analysis of the commissioned measurement data).

In preferred implementations of the optimization system the action determination system comprises a fourth interface to provide the mismatch identification data and the set of commissioned measurement data, thus providing data that a problem or fault exists or that a performance improvement is desired together with measurement data which can be used to diagnose the problem and/or improve the performance. The fourth interface may then receive network configuration information defining one or more altered configurations of the network to implement. The fourth interface may include an interface to a human mobile phone network engineer. However in some preferred embodiments the interface comprises an interface to an automatic optimization system.

The skilled person will be aware that such automatic optimization systems are an active topic of research and have been described in the literature; however one particularly preferred automatic mobile phone network parameter optimization system is the Actix GmbH Radioplan® system which implements automatic network design and cell planning, as described in US 2006/235674 and U.S. Pat. No. 7,353,160 as well as WO 2004/75050 (all hereby incorporated by reference in their entirety). Additionally or alternatively automatic frequency planning may be implemented by interfacing the Actix RTM CellOpt® system as described in US 2006/0141947 (Ser. No. 11/258,585) and WO 2004/084571 (both hereby incorporated by reference in their entirety). An interface to a human radio network engineer may comprise an interface to the Actix® Viewpoint® system as described in U.S. Ser. No. 10/587,462 (U.S. Ser. No. 11/768,676) and WO 2005/071890 all hereby incorporated by reference in their entirety.

In embodiments the first interface to receive performance data from the network and to identify a mismatch to a performance goal or problem/fault in the network may comprise an interface to the Actix® Insight® system; this system is described in more detail later. The measurement data analysis system may be implemented using one or more of Actix® Analyzer®, Spotlight® and Viewpoint®; details of call tracking systems and traffic analysis systems may be found in U.S. Ser. No. 11/396,260, U.S. Ser. No. 10/587,462, U.S. Ser. No. 11/768,679, U.S. Ser. No. 10/590,742 (and corresponding WO 2005/034551, WO 2005/071890 and WO 2005/086418) all hereby incorporated by reference in their entirety.

The second interface, to commission and receive measurement data may comprise any of a range of interfaces of the mobile phone network, for example at BSC/RNC level, to provide GPEH or similar data as described above. The scheduling of measurements may, for example, be controlled be the Actix® CellOpt MDA Scheduler system, although the skilled person will understand that alternative approaches may also be employed to interface with a network to schedule a collection of and receive data from the mobile phone network, and subsequently to analyze the data.

The invention also contemplates an automatic self-optimizing mobile phone network including a network optimization system as described above.

In a related aspect the invention provides a method of controlling at least part of a mobile phone network in response to performance data from said mobile phone network to optimize performance of the mobile phone network towards a performance goal, the method comprising: receiving performance data from said mobile phone network, said performance data comprising aggregated data for a plurality of calls; identifying a mismatch between performance of said mobile phone network represented by said performance data and said performance goal; identifying a set of measurement data for diagnosing said mismatch responsive to said mismatch identifying; commissioning said set of said measurement data from said mobile phone network, wherein said measurement data is selectively commissioned in response to said mismatch identification; receiving and analyzing said commissioned measurement data, to determine a probable cause of said mismatch, and to provide analysis data identifying said probable cause; determining action data using said analysis data, said action data identifying one or more configuration changes to be made to said mobile phone network to reduce said mismatch; and outputting said action data to change a configuration of said network to reduce said mismatch.

In some preferred embodiments of the method optimizing of at least part of the network is performed automatically, without manual intervention.

The invention further provides processor control code to implement the above-described systems and methods, for example on a general purpose computer system or on a digital signal processor (DSP). The code may be provided on a carrier such as a disk, CD- or DVD-ROM, programmed memory such as read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

These and other aspects of the invention will now be further described, by way of example only, with reference to the accompanying figures in which.

DETAILED DESCRIPTION OF PREFERRED ARRANGEMENTS

Figure 1:
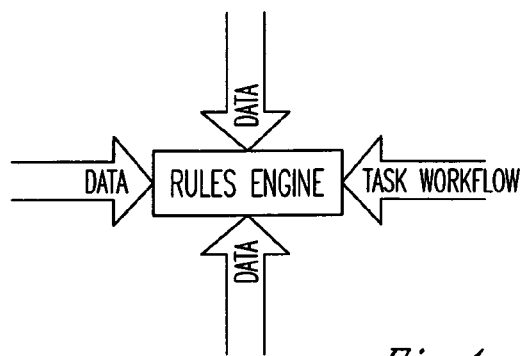
FIG. 1 shows an underlying concept of an automated performance management system for a mobile phone network.

It is helpful for understanding the invention first to describe details of a system for automated performance management of a mobile phone network. These are taken from GB0717904.7 (U.S. Ser. No. 11/871,732), incorporated by reference.

Automated Performance Management of a Mobile Phone Network: Outline

We have previously described a system for maintaining or optimizing a mobile phone network, the system comprising: a plurality of data feed inputs including at least one performance data feed input to receive performance data relating to performance of said mobile phone network over a first time period and at least one configuration data feed input to receive configuration data relating to configuration of said mobile phone network over a second time period; and a radio performance optimization system coupled to said plurality of data feed inputs, said radio performance optimization system comprising a rules engine to operate on said performance data and on said configuration data in accordance with a set of hierarchical rules and to output one or more tasks for network optimization, a said task comprising a definition of a potential fault, exception or optimization of said network to be investigated by a service engineer.

Such a system may be employed not only for fault detection and correction but also for dealing with exceptions and so-called design checks (so that a network configuration meets design criteria). Still further arrangements of the system may be employed for proactive network optimization rather than reactive response to perceived faults. Thus, broadly speaking, a task defines a condition of the network to be investigated by a service engineer in order to improve the performance of the network, either because a significant reduction in the usual performance has been detected or because a significant increase in the usual performance is desired.

Thus in some preferred implementations of the system the radio performance optimization system rules engine is able to operate on a collection of data from the data feeds covering at least ten of cells or cell sectors to output a said task without identification of a potential fault in said network, such that the system is able to perform proactive optimization of said network. The system may record action taken in response to a task, for example to correlate an action with a change in the performance data or configuration data, for learning a response to a cause of the action. The radio performance optimization system may use data from the data feed inputs to determine when a task has been completed, for automatically tracking implementation of tasks.

The rules engine may be configured to operate on the performance and configuration data using rules of at least two types, a first type to generate event data defining events relating to one or both of the configuration and performance, and a second type operating on the event data and optionally also on the performance and configuration data to identify a correlation in space and/or time in the event data, configuration data, and performance data. Thus preferably the hierarchical rules include at least one event rule and one correlation rule operating above this responsive to a configuration of multiple events. In preferred arrangements the performance and/or configuration data includes cell/sector-specific data so that events can be raised in relation to specific cells or sectors and/or radio or other components or elements of the network. Thus in preferred arrangements rules of the second type are able to correlate between a spatial and a temporal condition of the network, for example relating a changing configuration of a cell or sector to a drop or increase in performance. In arrangements this correlation extends over multiple sectors or cells, in particular over neighbouring sectors or cells (these neighbouring cells need not be physical neighbours but may be counted as neighbours if a handover/handoff is permitted between the cells or sectors). This facilitates sophisticated problem solving where, for example, a fault in one cell/sector causes a problem in a neighbouring cell/sector which may happen, say, if one cell/sector fails and a mobile device connects to a more distant cell/sector than the one which would usually serve it.

Preferred arrangements of the system also include a third type of rule to infer a potential fault, exception or optimization using the identified correlation and/or one or more events and/or raw performance/configuration data. Optionally such a rule may include a confidence measure on a diagnosis to reduce the possibility of false triggers and/or may incorporate a requirement of multiple correlations or events one after another, for example to put the system into a watch state on a first trigger prior to making a diagnosis following a second trigger.

In some preferred arrangements the rules also enable a task to be allocated to a queue of tasks, for example associated with a group of service engineers. Rules may also include rules to prioritize a task.

In implementations of this system a rule data store stores a set of rules configured to operate on the performance and configuration data to determine one or more aggregated performance indicators for said network, an aggregated performance indicator comprising an aggregated metric of performance of said network derived from data from a plurality of different elements of said network. A user interface may be provided to enable a user to define one or more of said rules using a parsed expression language. The user interface may enable a user to define one or more of said rules using a programming language which is able to provide a graphical representation of an operation performed by a rule operating on a plurality of said events.

In arrangements of the system a performance data includes data from counters, for example from an OSS (Operations and Support Systems)/OMC (Operations and Maintenance Centre) of a network performance management system of the network providing statistics such as number of dropped calls, number of hours on air and the like at various levels within the network including cell, sector, and neighbour level. Performance data may also include output data from one or more specific diagnostic programmes operating in the network. The performance data may be derived from multiple network elements and may comprise multiple files; it may be discrete, that is captured at time intervals, for example the end of each day or it may comprise a substantially live feed, for example hourly or more frequent. In arrangements the configuration data comprises data such as radio parameters, aerial azimuths and other physical attributes of the network. Typically this data changes relatively infrequently and thus may be referred to as "continuous" data; in some preferred arrangements where configuration data is stored, this data is stored in terms of initial values and changes, to reduce storage requirements. Configuration data may be obtained from, for example, a planning tool database for the network. The data feed inputs may further comprise an external data feed to received data such as alarms, reboot data (indicating whether or not a network element has been rebooted), trouble tickets (engineer performance reports) user defined events (for example a counter increasing above a threshold) and the like. Such data may be available, for example, from a network management system on the OSS. Typically this data is input in discrete form, for example daily although a substantially live feed may be additionally or alternatively be employed. Other types of data feed include a drive test data feed, which is particularly useful for network optimization. Examples of events which may be generated by event rules include an alert on a configuration change, an alert on a performance change, an alert to an equipment problem, for example an equipment alarm, and a user action alert (trouble ticket). Other events include volume events, traffic events, integrity events and the like. In some preferred arrangements rules for event triggering are predetermined and incorporated in the system, for example stored in local or non-local, non-volatile memory. Optionally a predetermined set of correlation rules applying to one or more predetermined sets of conditions is also provided.

In some preferred arrangements of the system an ability to provide a cell/sector or network element signature is provided. This may comprise historical performance data and may include a facility or rule to detect a long-term trend or change in performance, for example over 3, 6, 9 or 12 months or more. Such a site signature can be useful in identifying performance changes over long periods, for example due to cell/sector occupancy (say, near a beach in summer) or radio propagation, for example trees growing/shedding leaves, seasonal snow on mountains or the like.

Preferred arrangements of the system store some or all of the performance and configuration data in a database and provide a common window or front end onto this database, preferably abstracting the data in the database. This facilitates a generic front end for the rules for a range of different networks and, by providing additional functionality, facilitates rule construction. In arrangements the common interface is configured to implement a set of procedures or objects to operate on the data from the data feeds and to provide a common data access specification for this data. Optionally such procedures may include one or more key performance indicators (KPIs). This facilitates correlations between, for example, two such KPIs or a KPI and a configuration change. Such a KPI may comprise, for example, an aggregated metric of performance of the network derived from data from a plurality of different elements of the network.

In some preferred arrangements the interface comprises a two-way interface enabling events detected by rules to be stored back into the database. This facilitates implementation of higher level rules.

As previously described, in arrangements the rules are hierarchical and result in the output of tasks for service engineers, broadly speaking a task comprising a suggested fault identified for an engineer to address (for example, "receiver fault in sector X"). Optionally, however, a task may include a suggested diagnosis or fix for the fault, optionally with a confidence level. The confidence level may be determined, for example, by data entered back into the system by a service engineer, the system then determining, say, in what percentage of cases a particular fix corrected the fault. In other arrangements of the system correction of a fault may be detected automatically by the radio performance optimization system, based upon the performance and/or configuration data. Optionally feedback either manual or automatic from the result of intervention by a service engineer may be employed to modify or amend one or more rules, in order to make the system learning. There even exists the potential for a network to become at least partially self-healing/optimizing. In arrangements the radio performance optimization system monitors performance and/or configuration data from a plurality of cells/sectors, in particular neighbouring cells/sectors of one on which a task has been performed since action on one cell/sector may influence and potentially correct problems on another cell/sector by especially a physically or logically neighbouring cell or sector.

In arrangements of the system the radio performance optimizer rules engine is able to operate on a collection of data from data feeds covering a group of cells/sectors, for example 10, 20 or more cells/sectors, which is particularly advantageous for network optimization since this is best performed over a group of cells rather than individually cell or sector by cell or sector. In arrangements changes may be made and the effect on neighbouring cells/sectors may be monitored and further changes made to achieve optimization over an area of the network.

As previously mentioned rules may be predetermined but in some preferred arrangements of the system rules may also be defined by a service engineer and stored for later use. In arrangements a user interface and programme operating systems such as an interpreter or compiler is provided to enable a user to define one or more rules using a programming language such as parsed expression language. However in some particularly preferred arrangements a graphical rule definition interface is also provided, for example using drag and drop programming or workflow programming or, in particular, by providing a graphical representation of an operation performed by a rule operating on a plurality of events. One preferred format is a grid or tabular format in which columns (or rows) are associated with events and rows (are columns) are associated with correlation outputs for example to identify potential faults, exceptions or optimizations. In such a case a user may define an entry in a grid position associating an event on a column with an output on a row and logical combinations of events may be described by multiple entries in a row, one at each column location to which a logical operation on an event is desired. Thus, broadly speaking, in some preferred arrangements one or more of the rules are defined by a form of spreadsheet.

In preferred arrangements a service engineer user interface is provided for task output in which the user is able to access one or more tasks and, in addition, to list one or more events and/or correlations or other intermediate data items which contributed to the task. Preferably a user is also able to list one or more network elements to which the task relates, and optionally other data relating to the task, for example an earliest/latest event date, or more generally, a view of historical data relating to one or more events on which the task is based. In some particularly preferred arrangements the user interface comprises a graphical user interface representing a task on a graphical map of the network including representations of cells and/or cell sectors of the network, preferably also providing drill-down from a task down to one or more events as previously described.

We have also described an automated performance management system for a digital mobile phone network, the system comprising: a rule input to receive rules for operating on data from said network; a data input to receive one or both of performance and configuration data from said network; and a rules engine coupled to said rule input and to said data input to operate on said data from said network using said rules, and wherein said rules engine comprises: an event layer to identify changes in one or both of said performance and configuration data and in response to generate events; and a correlation layer to operate on combinations of said events to identify potential faults, exceptions, or optimizations of said network.

Preferably the rules engine includes a diagnosis layer to output data from the correlation layer relating to multiple identified potential faults, exceptions or optimizations, to thus provide increased confidence or probability of identification of a potential fault, exception or optimization, in particular, from a "signature" of the condition. Still further preferably a workflow layer is also provided to allocate one or more of the potential faults, exceptions or optimizations to one or more tasks as described above. Preferably such tasks (or data identifying these tasks) are output, for example on a graphical user interface. Still further preferably a task grouping system is provided to enable tasks to be allocated to one or more queues, for example according to business rules. In arrangements the workflow layer may also manage the tasks, for example manually or automatically verifying and closing a task.

We have also described an interface to a plurality of data feeds from a digital mobile phone network, said data feeds including at least one performance data feed input to receive performance data relating to performance of said mobile phone network over a first time period and at least one configuration data feed input to receive configuration data relating to configuration of said mobile phone network over a second time period, wherein said interface is configured to implement a common set of procedures across said plurality of data feeds to provide a common data access specification for said data from said data feed inputs.

In some preferred arrangements the procedures (or objects) include one or more of a set of operator or network provider conversion procedures to map from a data format specific to an operator of the network to a data format of the common data access specification, a set of event procedures to identify (or to record back into a database to which the interface is attached) events in the network, a set of network model procedures to provide data on the configuration of elements in the network, and a set of network attribute procedures to provide data relating to attributes of the network, for example a list of attributes, say at a cell/sector level, and/or values of attributes, and or historical values and the like.

Preferably the interface is attached to a data store storing one or both of the afore-mentioned performance and configuration data, although in other arrangements the interface may provide a window onto a database managed, for example, by a network operator to provide some of the data to which the common interface gives access. Thus in arrangements the interface provides a window or aggregation point for multiple databases providing a common data access specification and a common set of procedures abstracting the data in the databases. In this way, for example, a common window may potentially be provided to data relating to multiple different logical networks which may share at least part of a physical network. This is particularly advantageous because of the growing trend for network operators to share physical network elements such as cell/sector elements.

Automated Performance Management of a Mobile Phone Network: Detail

To provide context helpful for understanding operation of embodiments of the invention we first describe an automated performance management system for a digital mobile phone network that streamlines an engineers' work. The system utilizes the data in the network's existing systems and uses built-in intelligence to generate engineering tasks based on events that are detected in the data and to provide the engineer with a simple, process-driven desktop application (sometimes referred to as the engineering client) based around a task list and a map. The engineering client makes it easy for engineers to make fast and effective optimization decisions by combining their local knowledge (for example, about problems that started when the cranes were erected for that new tower block that is being built near the shopping mall) with the system's automated decision aids. The system also facilitates communication between and within the engineering teams.

FIG. 1 illustrates the concept underlying the system. Data is obtained from a plurality of sources and input into a rules engine. The rules engine processes the data to generate a task workflow that attempts to optimize the digital mobile phone network. The task workflow is, in effect, a list of tasks that are provided to the engineer to address identified problems and component optimization. Example tasks may, for example, include (but are not limited to) simple commands to reboot the Base Station Controller (BSC), adjust the frequency in a particular cell or sector, to close an alarmed service hatch or access panel on the Base Station, or other such commands. The methods used in and structure of rules engine will be discussed in detail below.

In its simplest form, the rules engine attempts to optimize the network based on the data received from the system. Network optimization is the process of improving the performance of a radio network through planned changes to its design. However, it is difficult to judge whether optimization work has been successful unless the performance of the network is relatively stable. This requires continuous remedial action—otherwise performance degrades over time, because of the tendency for network equipment to deteriorate with age and heavy use. This continuous remedial action is sometimes referred to as housekeeping and although it is not strictly an optimization activity, it is closely related to optimization and is frequently performed by the same personnel.

Because housekeeping activities are generally reactive in nature, they are sometimes referred to as reactive optimization. This involves detecting, investigating and resolving faults and other issues; for example, investigating equipment alarms that have inadvertently been dismissed by operations staff because no other symptoms were obvious. The aim of reactive optimization is to avoid lost revenue through performance failure and to maintain an operating baseline from which it is possible to address the true optimization activities. These are proactive in nature and are therefore referred to as proactive optimization. This type of optimization requires study, deliberation and careful design and involves modifying the configuration of the network (for example, adjusting sector parameters and site configuration) with the aim of driving the performance up from the baseline in order to achieve the greatest possible revenue. The above system facilitates both of these types of optimization and they are considered separately below.

Reactive optimization (also referred to as housekeeping) typically involves three phases: Problem detection; Problem diagnosis; and Solution deployment Without the above system, each of these phases can involve many manual steps. For example, optimization engineers have traditionally spent a lot of time running scripts and other procedures to extract and combine data from many systems and databases in order to be able to detect problems, before they even start to diagnose the causes and deploy solutions.

The above system speeds up the reactive optimization process by automating the detection and diagnosis of many problems and facilitating the sign-off of routine tasks and the investigation of the minority that require it. It is generally accepted that it is theoretically possible to automate the detection of 99% of network faults, the diagnosis of 80% of them and the deployment of a solution in 65% of cases.

Within the system, reactive optimization activities are handled as tasks. By default, when you open the system engineering client, it opens on a Task List, which lists and ranks the tasks for the current area in a "to do" list. This means that engineers no longer need to spend much of their time looking for problems and can instead concentrate on dealing with them. For many tasks, this simply involves accepting the automatically diagnosed solution.

Typically reactive optimization cycles are short and tend to involve one or a small group of sectors.

Proactive optimization is "true" network optimization. Unlike reactive optimization, which simply aims to maintain the status quo, proactive optimization aims to make adjustments to the design of the network in order to actually improve its performance. The present system facilitates proactive optimization by providing a rich suite of optimization and visualization tools and access to the network data in the database. The system provides a mechanism for embedding engineering best practice within the proactive optimization process while providing the flexibility for engineers to pursue their investigations in the ad hoc manner appropriate to the activity in hand.

Proactive optimization activities generally involve 30 or more sectors and include:

Performance Benchmarking
  This involves a period when only reactive activities are carried out in order to get an accurate measure of network baseline performance such that it can be used to assess whether improvement has been made against a earlier/later performance benchmarking.
Benchmarking Drive Surveys
  These are frequently undertaken at the beginning and end of a project to carry out a before and after check. The system can schedule the drive test and generate a reactive task when the data becomes available.
Competitive Drive Surveys
  These are periodically undertaken as a means of comparing performance with other, competitive networks to determine whether deficiencies in own network performance exist.
Neighbour Tuning
  This involves a holistic look at neighbour lists often using measurement programs. The system facilitates this by passing the necessary parameters to another tool.
Retuning
  This involves changing frequencies or scrambling codes (SCs) at the controller (or wider) level. This is undertaken periodically to take account of new sites and/or capacity demands. Insight facilitates this by passing the necessary parameters to another tool (such as AFP).
Frequency/SC Planning
  This involves the local optimization of the frequency or SC plan. The system facilitates this by passing the necessary parameters to another tool.
Parameter Trials
  These involve a trial of sets of parameters usually over several weeks and at the controller level. This activity can be performed within insight.
Ad Hoc Parameter Changes
  This involves the setting of various parameters (including the allowed radio parameter set and neighbour relationships) on individual sites. This activity can be performed within the system.
Antenna Changes
  This involves changes to the panning (orientation) and tilting of antennas or complete swaps. Most changes rely on little or no extra hardware cost (pre-approved budget); the optimization team typically runs a team of contracted riggers to do the work. The system facilitates this activity by passing the necessary parameters to another tool.
Site Configuration
  This involves the installation of new hardware (such as an LNA) or antenna work such as raising the height of an antenna. These activities are normally tracked in a site build database and become a signoff task within Insight.

The system is not a replacement for network operators' existing systems—instead it uses the data from those systems. Typically the data is scattered in a plethora of different databases, sometimes on a per region basis. For example, the system handles the following broad categories of input data:

Network configuration data. This relates to the configuration and properties of the equipment (called network elements) in the physical network, such as the switches, controllers, sites, Base Transceiver Stations (BTSs), sectors, radios and antennas. Typically this data is extracted from planning tool database(s) and/or configuration management systems. When the data relates to multiple technologies (for example, 3G and 2G), the data for each technology may be extracted and loaded into the system separately. Although this data is preferably loaded into the system daily, its rate of change is typically fairly slow after the initial rollout phase. After loading into the system, this data is stored in the database as continuous values, which means that once a value is known, that value continues to be valid until it changes.

Performance data. These are counters and other statistics recorded on individual network elements (such as sectors or radios). Typically this data is extracted from an Operations and Support Systems (OSS) performance management (PM) tools tool. This data changes rapidly and each load is separate and independent. This data may be loaded into the system daily, but may instead be loaded more frequently, for example every 15 minutes.

Neighbour data. This defines the neighbour relationships between sectors and usually includes parameters that control the handover function as well as handover statistics. Typically each sector has a list of sectors that are potential handover targets. Each source-target pair is a tuple and has parameters that control it and performance counters that are maintained so that the network operator can monitor its performance. Typically the neighbour tuples and their parameters are extracted from a configuration management database and the performance counters from the performance management system. Like the other network configuration data, the neighbour configuration data generally changes fairly infrequently after the initial rollout phase. Therefore this data is generally loaded daily or less frequently.

Alarms. These are events that are detected in the network prior to loading into the system. For example, an alarm might correspond to a buzzer that sounded in the network control room when an intruder broke into a base station. These alarms are sometimes called equipment alarms to distinguish them from the performance and configuration alerts that are detected by the Rules Engine within the system. Equipment alarms relate to a network element (typically a site or sector) and typically include a description of the problem and possibly diagnostic information. Equipment alarms are stored in the database as events rather than attributes.

Site build data. This data comes from a "Site Build" database, which tracks the status of new and existing sites and includes upgrades to existing equipment such as capacity upgrades. For example, a "New Site" event might be triggered by the Rules Engine when a site's status changes to "Integration" in the Site Build database, indicating that a new site is coming online.

Drive test data. The system may also handle drive test data. Drive test data comprises data captures from a survey performed by driving a test mobile handset through a particular area and capturing the data transmitted between the mobile handset and the digital mobile phone network to analyze the network performance.

Trouble tickets. The system may also handle trouble tickets from an external trouble ticket system. Trouble tickets are a means to allow problems with the network to be logged and the progress of the solution to be tracked.

The above list is not an exhaustive list of data types. Other types of data will be known to those skilled in the art.

The types of data stored or used by the system break down into two main categories: discrete and continuous. This categorization affects how the data is stored in the database and which functions are used to retrieve the data from a data store. Discrete data are values that represent a snapshot of an aspect of the network at a moment in time. For example, a discrete data might be a KPI (such as the number of dropped calls) for which every value has meaning, even when there are the same number of dropped calls for several days in a row. Continuous data are values (such as a sector's tilt or beamwidth) that change infrequently. Once the value of a continuous attribute is known, that value continues to be valid until it changes. In order to conserve space within the database, values are stored only when they change.

Figure 2A:
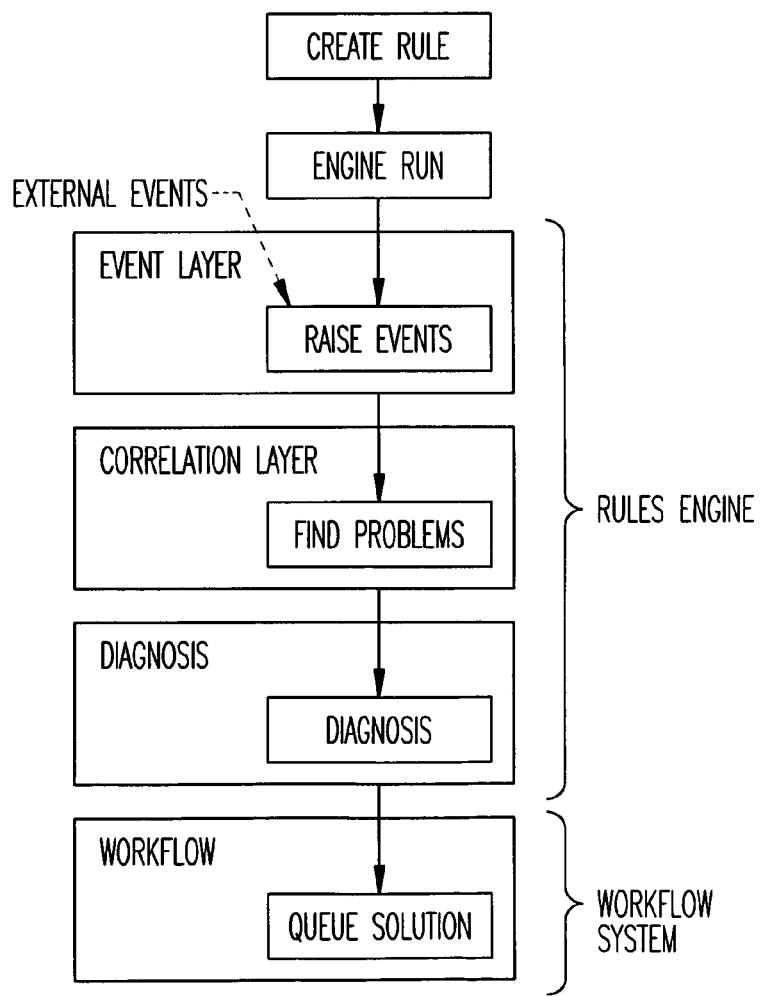
FIG. 2A shows the process of generating the task workflow.

Data is retrieved from the various sources and is stored in a Nexus database. FIG. 2a shows the processes behind the generation of the task workflow, which will now be described.

The rules engine, implemented as a Nexus Rules Engine, comprises a number of layers: an event layer, a correlation layer, and a diagnosis layer. The Nexus Rules Engine applies special expressions (called rules) to the data in the Nexus database. The rules define the formulas and diagnoses that generate performance alert and other events and create the tasks that are shown for each engineer on his or her system display.

The rules define the performance and configuration alerts and other events on which the task is based. Generally, performance alert formulas are run against data in the Nexus database, for example OMC counter data (a record of the number of key events from the OMC, such as dropped calls, handover failures etc), configuration alert formulas against the configuration data in the same database, and externally generated events. For example, a performance alert formula might define upper and lower-bound thresholds for each counter that is being monitored. A counter might measure the number of Radio Resources Control (RRC) Active Connection Failures caused by the radio interface. The formula might then specify that a performance alert should be triggered when the counter value simply exceeds the upper-bound threshold. Externally generated events include, for example, equipment alarms that detect when an external piece of equipment is not performing correctly, cabinet door alarms for detecting when a cabinet door is left open, and other like alarms.

Figure 2B:
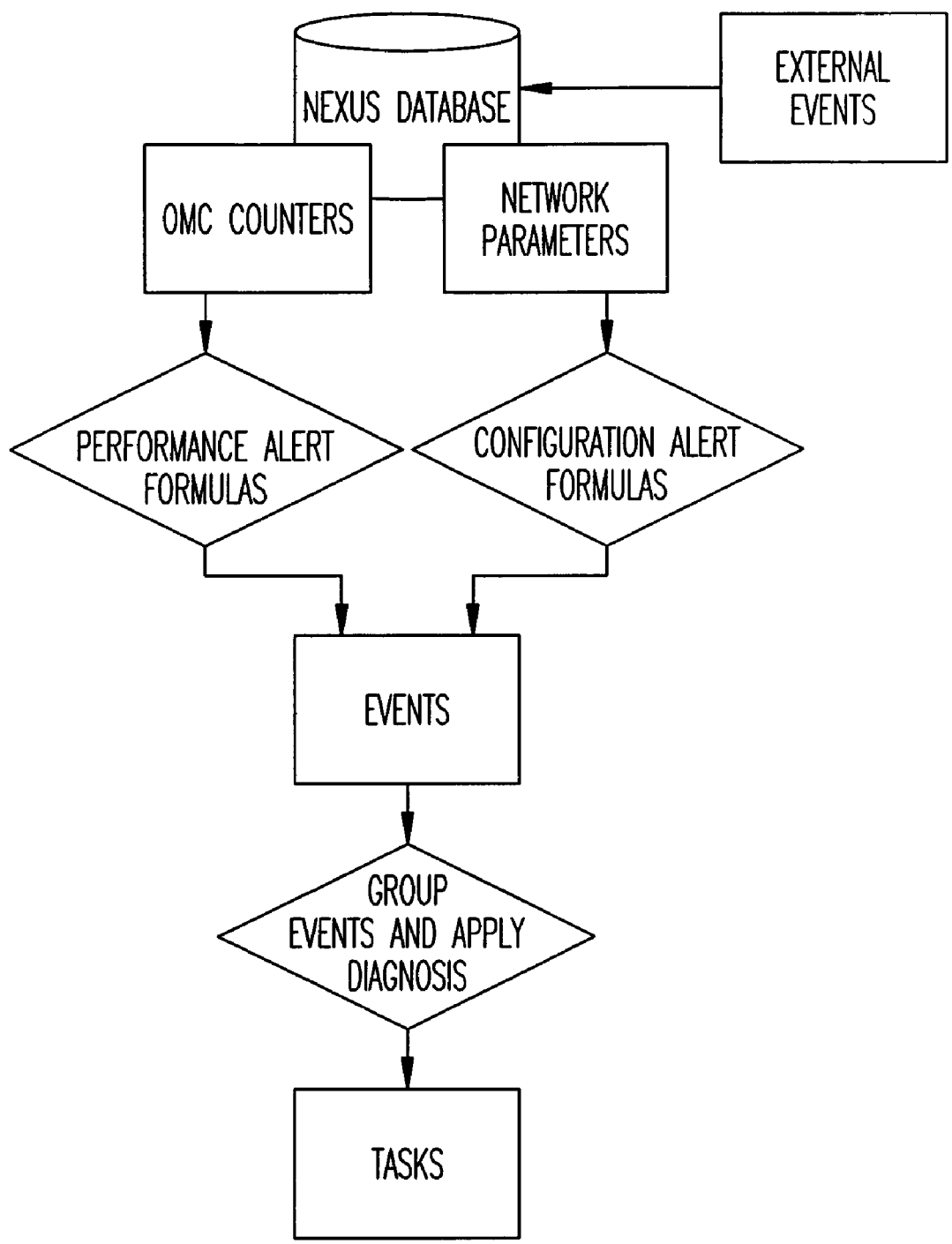
FIG. 2B shows a block diagram of the event generation.
Figure 2C:
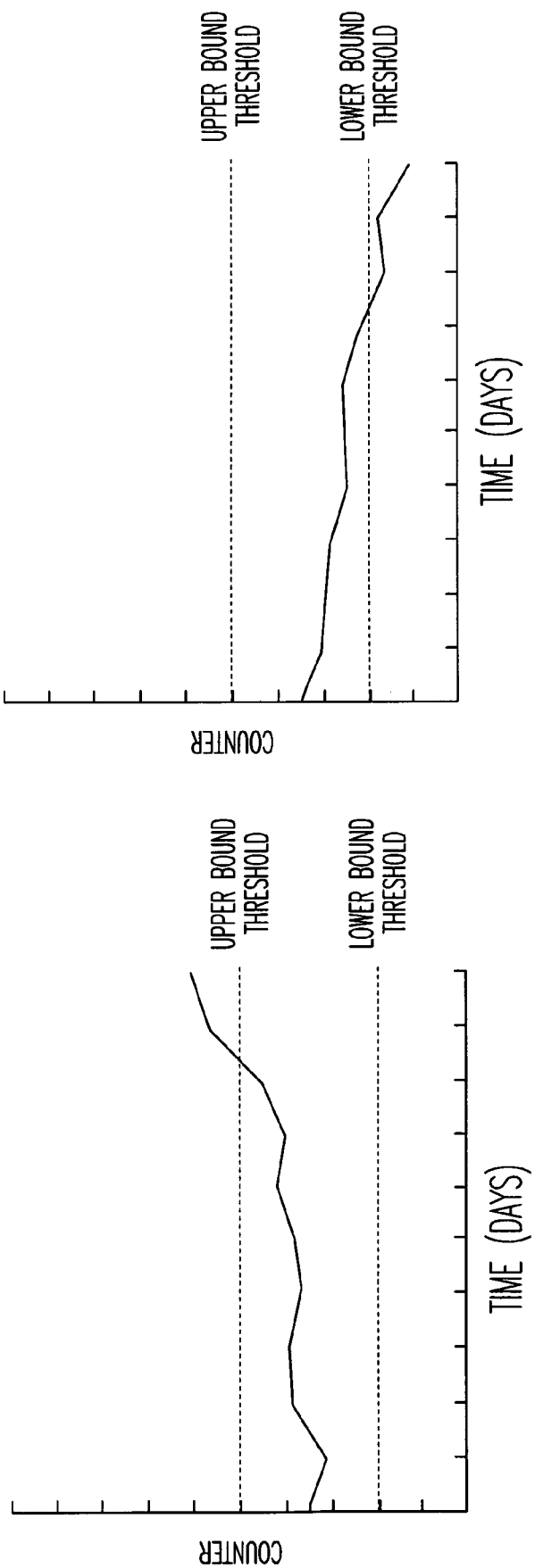
FIG. 2C illustrates example triggering thresholds for such alarms.

FIG. 2b shows a block diagram of the event generation and FIG. 2c illustrates example triggering thresholds for such alarms. Triggering from pre-set thresholds enables the system to filter out 'false-positive' alarms.

The rules may be more complex than the above examples. For example, a performance alert can be triggered only when the average counter value for the last seven days exceeds the upper threshold plus three times the standard deviation; or when the maximum value recorded over the last fourteen days multiplied by 120% exceeds the upper threshold, etc.

KPIs (key performance indicators) are measures that gauge the success of the network and enable network operators to look at the network from an overall perspective, track its performance and identify areas that need attention. For example, KPIs are often used to test whether the network is performing according to targets and goals. KPIs are generally calculated from the counter data. The formula for an RF Dropped Call Rate KPI might be:

$$RF\_Dropped\_Call\_Rate = (Drops\_RF/Call\_Setup\_Success\_RF)*100$$

Where Drops_RF and Call_Setup_Success_RF are the counters for dropped calls and successful call setups, respectively. However, the exact definition might vary from operator to operator.

Generally, KPIs are generated by the system by the rules and are handled using calculated attributes. These are special attributes whose values are calculated on the fly from other attributes (typically OMC counters) using an expression that is stored as part of the attribute definition in the Nexus database. This means that it is possible to easily generate statistically valid KPIs for any combination of sectors, for example.

Each triggered alarm is associated with an event in the event layer of the rules engine. Effectively, the events identify changes in performance or changes in configuration of the network, or a combination of both.

Once the events have been identified, the rules group the events in the correlation layer to form a hierarchy of events. The lowest layer in the hierarchy of events comprises the above-mentioned detected events triggered from alarms and KPI threshold comparisons. Higher levels in the hierarchy comprise new events generated by the rules from grouped events from the lowest level. The rules group the lowest level events by identifying known problems associated with such a group of events. By grouping the events, the rules filter out the symptoms of a problem to identify the cause of the problem.

Figure 2D:
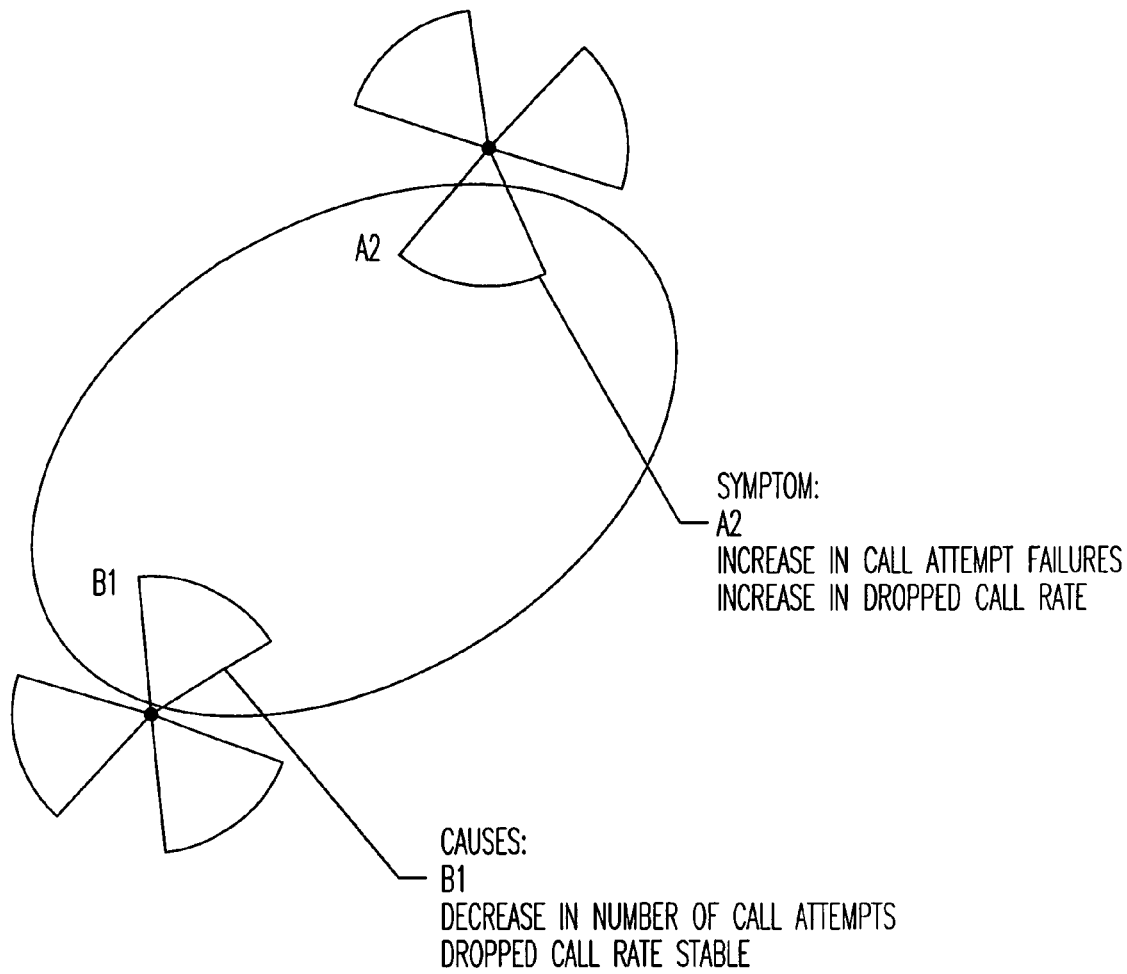
FIG. 2D illustrates another example.

See FIG. 2d for an example. Suppose sector 2 in site A is exhibiting an increased rate of dropped calls and call attempt failures. By looking at the events alone we would expect this to mean there is a problem with that sector. However, it is possible to create logic to compare the performance of the neighbouring sectors to establish whether any of them are in fact causing the problem (for example, sector 1 on the neighbouring site B might have a decreased number of call attempts and a stable dropped call rate, indicating that it is in fact the cause of the problem in sector A2). It is possible to create a rule to automatically detect this and generate a task that instructs the engineer to address the issue in sector B1.

The diagnostic layer comprises rules that apply diagnostic logic on the grouped event results from the correlation layer in order to create the engineering tasks. This could, for example, comprise the construction of a multi-dimensional array of fault signatures using events to diagnose known causes of known problems.

Once the diagnoses have been generated, the system identifies and creates one or more tasks to address the identified problems. Tasks are specific to a particular engineer or engineering team and are stacked in a queue. The queue is prioritized dependent on a number of factors, including the age of the problems; the volume of events triggered from a particular problem and other such schemes. For example, a larger volume of triggered events for a particular problem in the network will raise the priority of the associated task.

In their simplest form, the tasks themselves comprise a description of the suspected problem and a suggested diagnosis and an implementation of a solution. However, the system associates each of the tasks all of the underlying data used to generate that particular task. Therefore, when displaying a particular task, the engineer can view all of the data that was used in generating that particular task, which gives the engineer the context in which the task was generated, further aiding the engineer's implementation of the solution.

In general, KPIs are defined as scripts in the rules engine, which enables them to be applied to any number of elements within the system in a dynamic way to give a measure of performance on one or more levels of the system. As such, KPIs can be generated to evaluate the impact of a problem over not just one element, but over an area. For example, KPIs could also be generated at the BTS, controller and area level and the results aggregated to determine the performance of the network at each particular level.

We will now describe various implementations of the above system.

Figure 3:
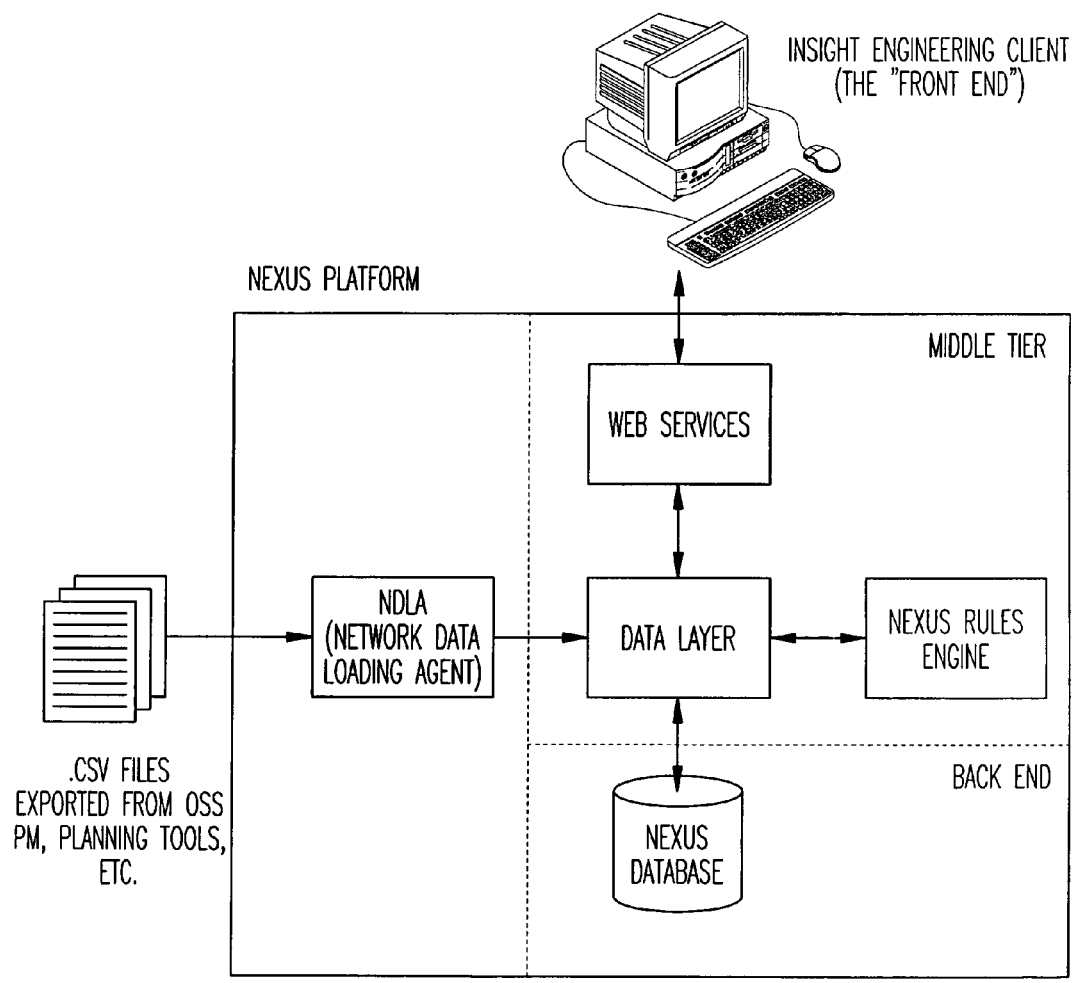
FIG. 3 shows a logical architecture of an automated performance management system for a mobile phone network.

FIG. 3 shows a logical architecture of the system. The architecture comprises a data repository (the applicant calls the Nexus database) that may for example be implemented in Oracle running on a Linux server. The database stores data from a variety of different sources, including counter data. This data is collected by the network, usually by the OMC. Network operators use a variety of different systems to handle their counter data. These systems are called Operations and Support Systems (OSS) performance management (PM) tools and typical examples are Metrica Performance Manager and MYCOM. The present system may receive summary data from the OSS PM (typically overnight). Usually this output will be in a comma separated variable (.csv) format.

The Network Data Loading Agent (NDLA) loads the output from the OSS PM tool into the Nexus database. The data is stored in the database in such a way that KPI (key performance indicator) statistics can be retrieved for a specified period (for example, the last 30, 60, or 90 days).

The Nexus database also stores network configuration data, which records the location (latitude, longitude, height, etc.) and configuration (beamwidth, azimuth, etc.) of the base stations, the lists of neighbouring sectors, etc. This data is generally exported from the network operator's network and neighbour planning tools in a comma-separated or similar format, and is then loaded into the database by the NDLA. Just like the counter data, changes are stored over time, so that changes in the KPIs can be correlated with changes to the network configuration. For example, users can compare KPIs based on counter data collected before and after a cell's azimuth was changed, etc.

The middle tier is a layer between the Nexus database at the back and the engineering client at the front. It caches information to improve the performance of the system and comprises the following:

A Web service-based API, which handles all of the communication between the engineering client and the database. Web services are a standard technology for exchanging information between computer systems across intranets and the Internet with support for end-to-end security.

A data layer, which provides standardized access to, and presentation of, the data in the database, regardless of its underlying structure.

The Nexus Rules Engine, which applies logic based on defined rules to the data in the database. The logic is defined in an expression language, such as AXEL.

Together the middle layer and the loading and back-end components are referred to as the Nexus platform, which is an enterprise platform that provides a high quality and scalable service for handling large volumes of data.

Figure 4A:
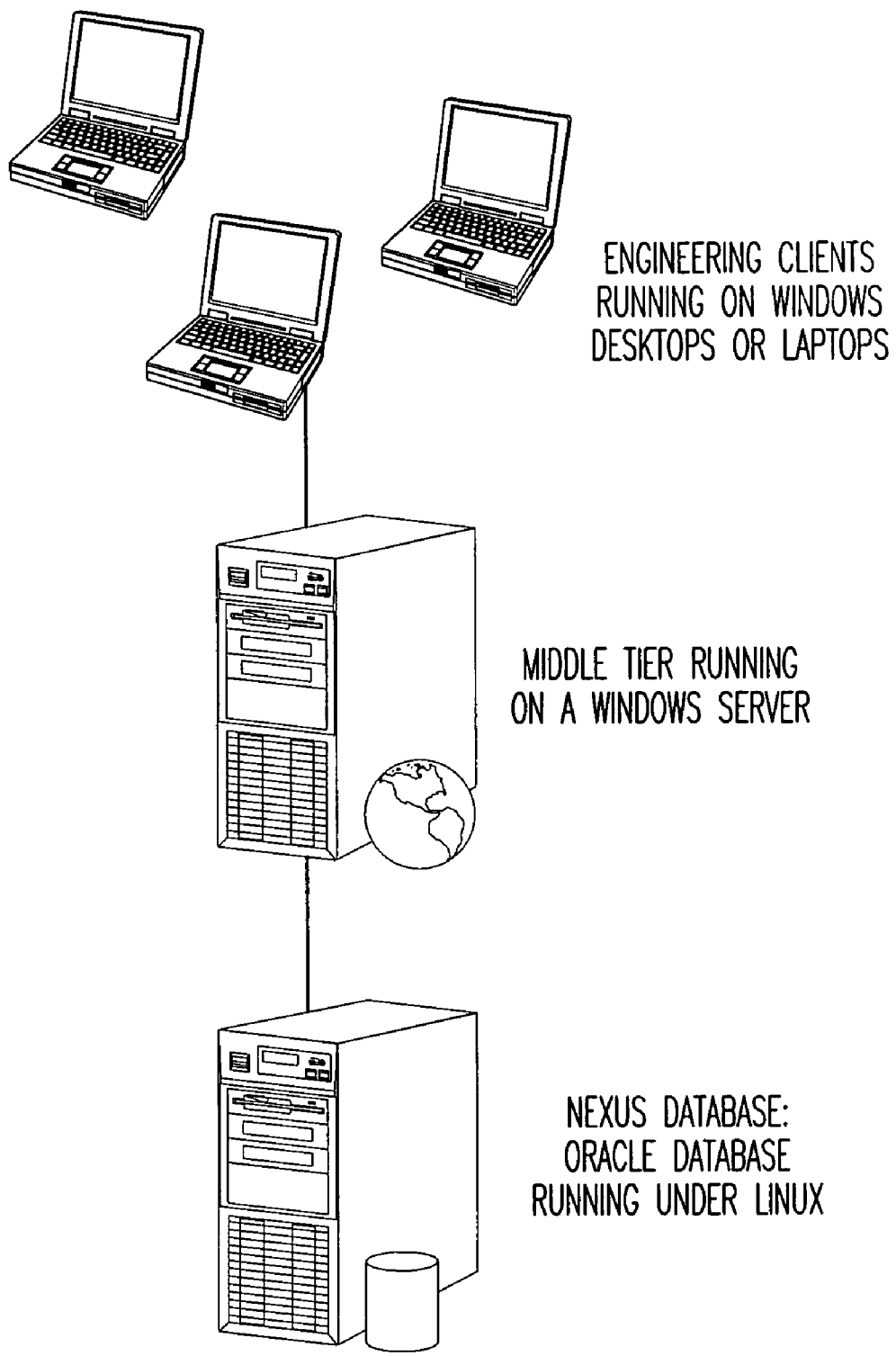
FIGS. 4A and 4B show two potential hardware configurations of the system.
Figure 4B:
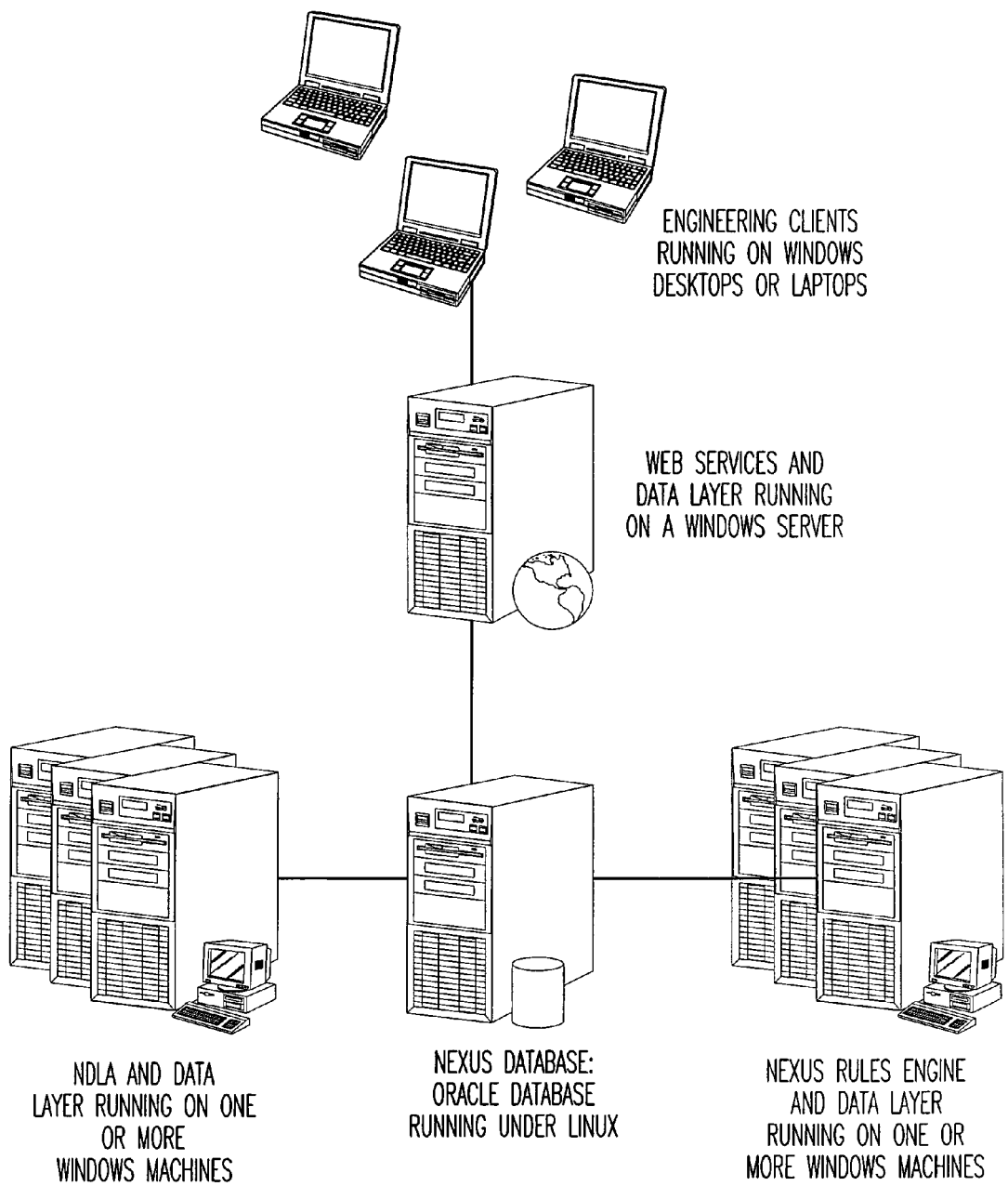

FIGS. 4a and 4b show two potential hardware configurations of the system. These provide examples of how the system and the Nexus platform can be scaled to meet the requirements of organizations of a wide variety of sizes.

FIG. 4a shows the Nexus database being connected to the middle tier, which is running, for example, on a separate Windows server. The engineering clients are shown connected to the middle tier and running on Windows desktop or laptop computers.

FIG. 4b shows the Nexus database being connected to first to a NDLA and Data layer running on one or more Windows machines, and secondly to a Nexus Rules Engine and Data Layer running on one or more Windows machines. The Nexus database is also connected to a Web services and Data layer running on a Windows server, to which the engineering clients connect, again running on Windows desktop or laptop computers.

We shall now look at the network components in more detail in turn.

The Nexus database is the data repository. It is a standard relational database and may, for example, be implemented in Oracle. The database contains a number of tables that store the data. Other components of the system do not access the database tables directly. Instead they communicate with the database using stored procedures, in order that they are insulated from any changes to the database schema that might be required over time.

In embodiments the other components do not call the stored procedures directly. Instead they call the middle tier's data layer, which in turn calls the stored procedures. This is designed to insulate all of the other components from the database implementation details and provides an infrastructure that is capable of handling multiple database implementations. This means, for example, that if support for a different database technology is introduced, only the data layer will need to be updated.

Stored procedures provide an API to the Nexus database. The API includes separate functions for each of the components of the system (NDLA, Admin Client, Engineering Client, Drive Test Loading Agent, Reporting Client). Because the data is sent to the client applications through the Web service, it is important for performance reasons that only relevant data is sent.

Data is loaded into the database in batches and is stored temporarily in two staging tables prior to being moved into the appropriate tables (depending on whether the values are discrete or continuous) for long-term storage. All data is stamped with the load event ID, which means that when necessary a batch load can be rolled back (undone).

Figure 5A:
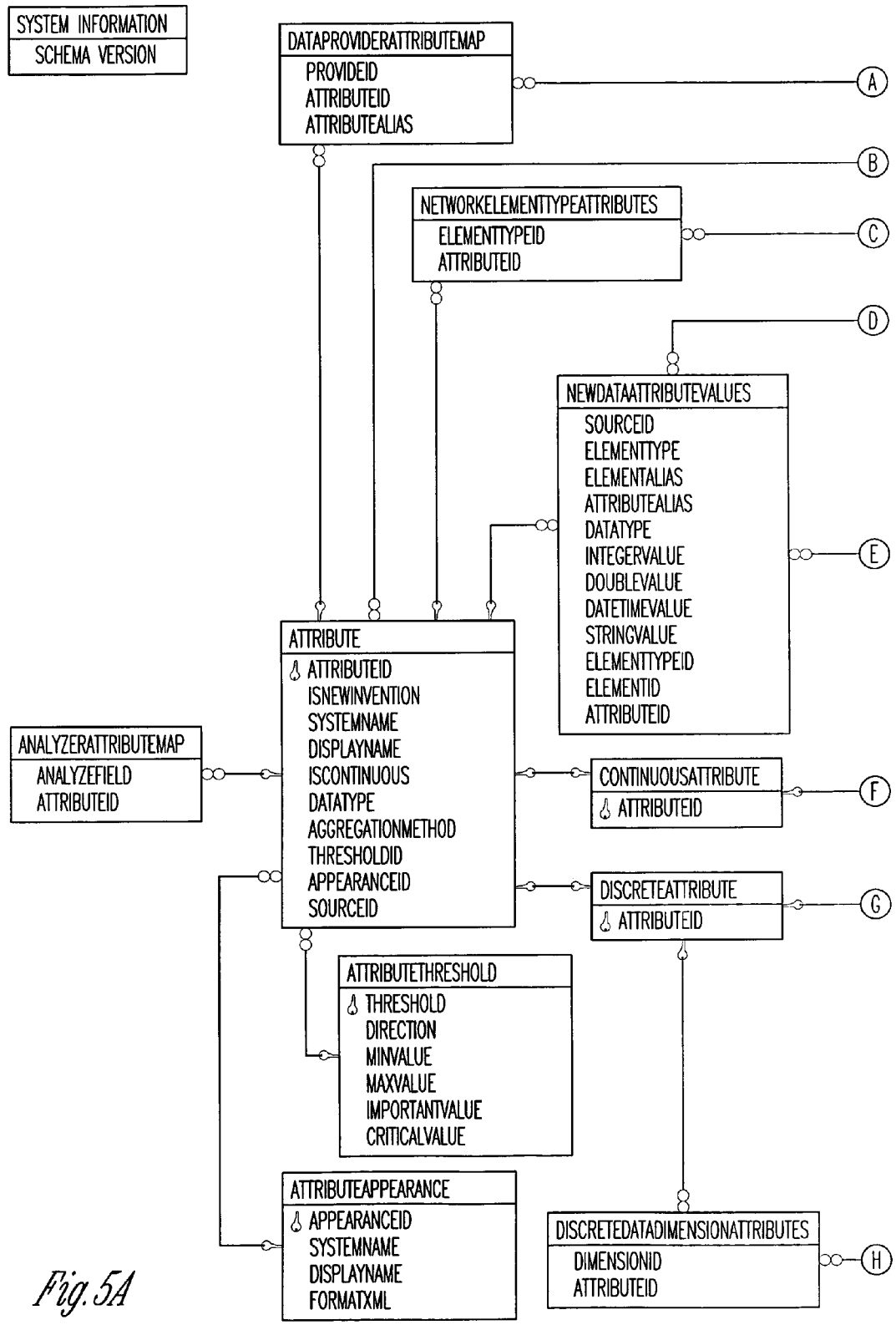
FIGS. 5A, 5B, and 5C show a graphical representation of the tables within the database schema.
Figure 5B:
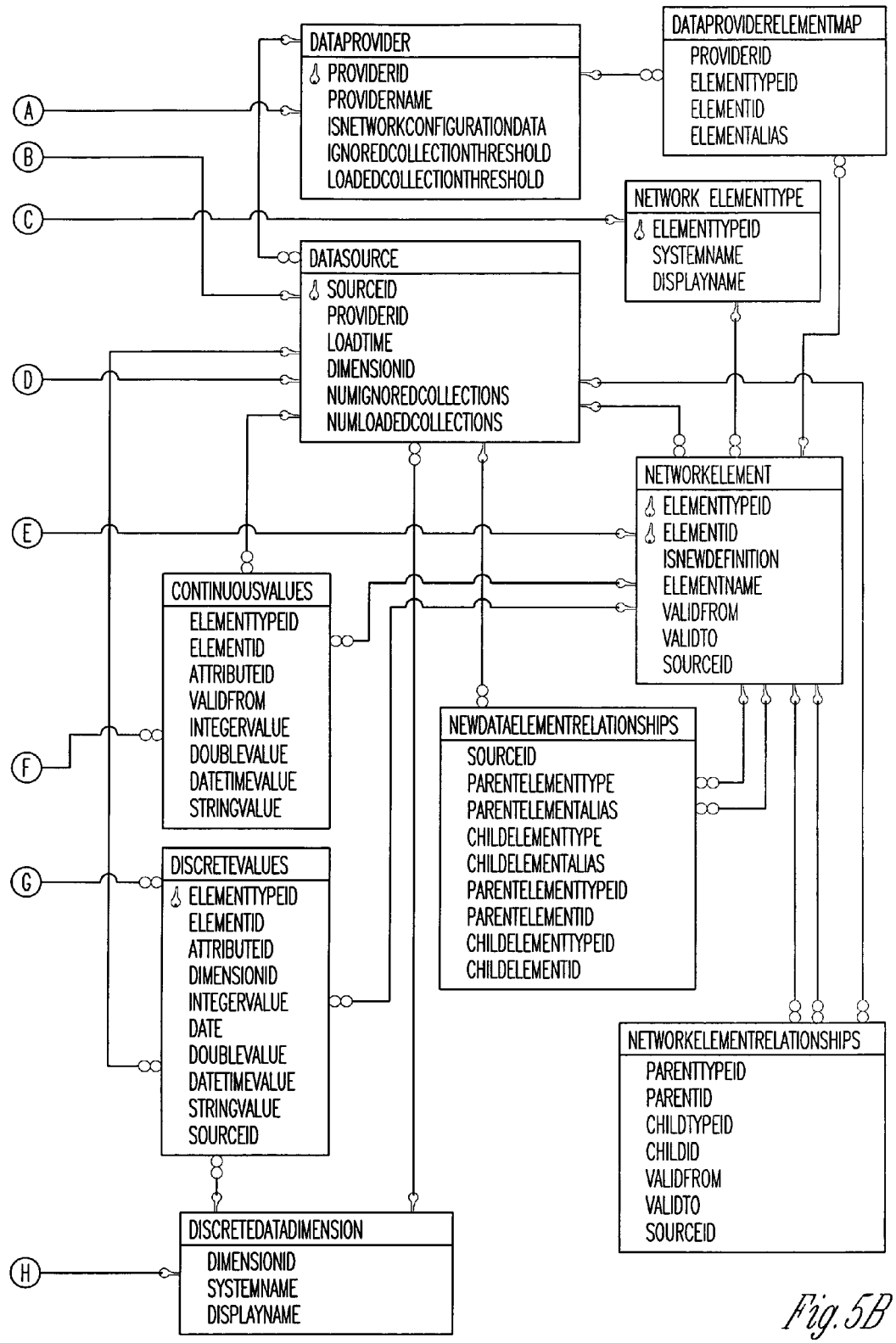
Figure 5C:
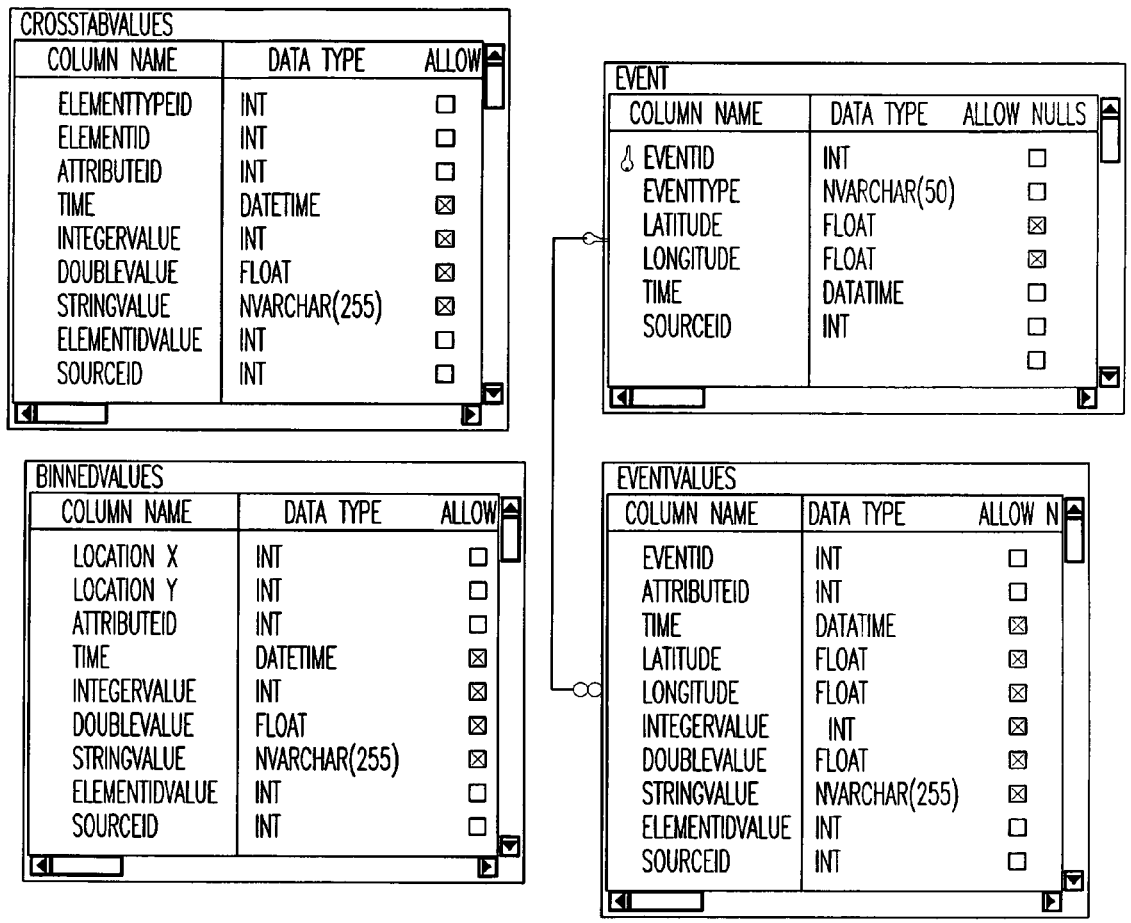

FIG. 5 shows a graphical representation of the tables within the database schema.

Figure 6:
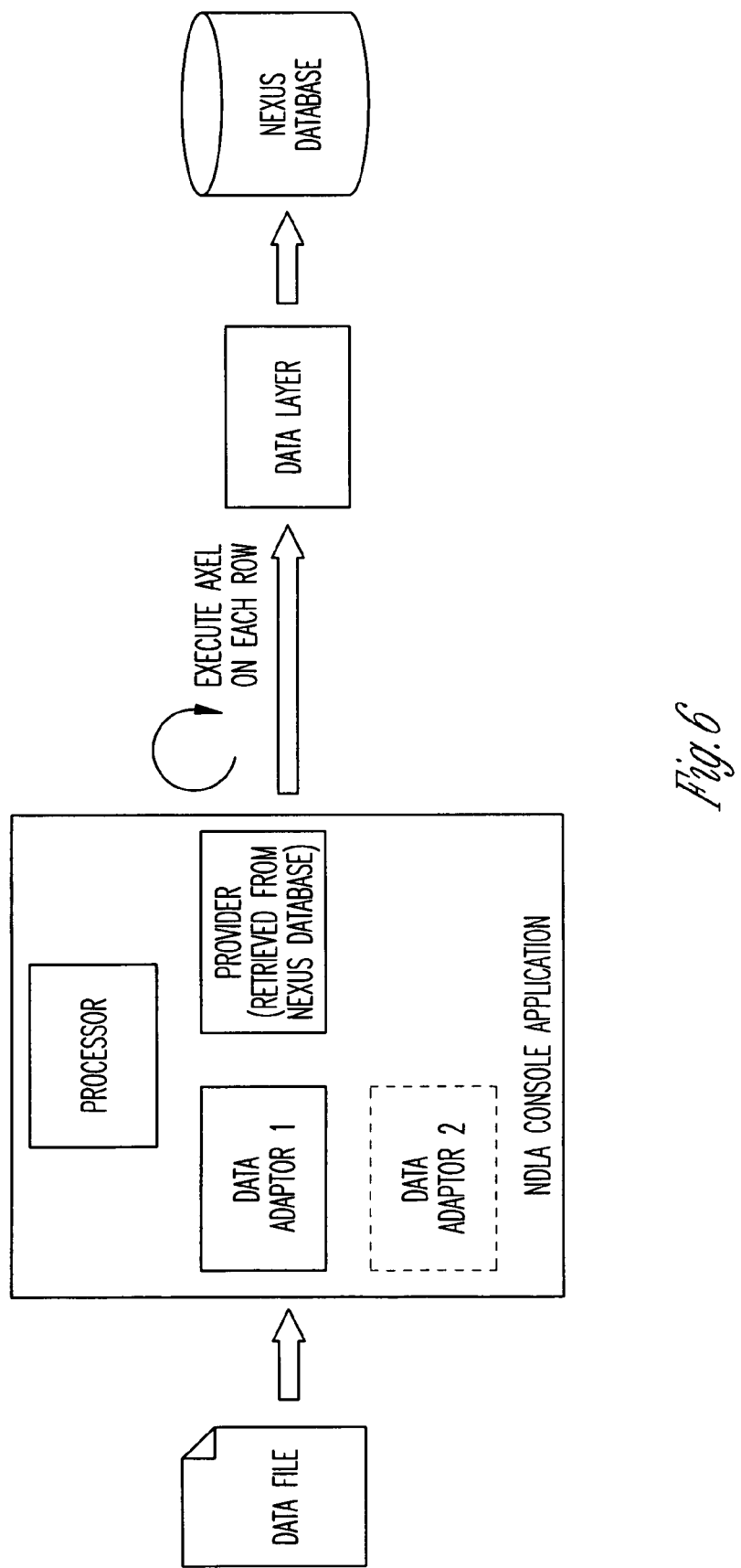
FIG. 6 shows the Network Data Loading Agent (NDLA)

FIG. 6 shows the Network Data Loading Agent (NDLA). The NDLA loads data into the Nexus database and comprises around the following components:

File Monitor. This is a Windows Service that monitors one or more folders for new files that are ready for loading. When the File Monitor detects a new file in one of the monitored locations, the File Monitor checks the file's read-write status and when it becomes writable (which indicates that it has been released by the application that is writing it), the File Monitor activates the console application and passes it the names of the file and the provider for data files in that location.

Console Application. This is a Command line application that has two compulsory arguments and additional optional ones. The compulsory arguments specify the names of the data file to be loaded and the provider to be used. At run time, the application fires a processor, which retrieves the named provider from the database, fires up the data adaptor of the appropriate type (.csv, fixed width, etc.), iterates the rows in the data file, running on each field the AXEL statement specified in the provider. The console application also logs progress, reports any errors and emails them to the administrator.

Providers. These are specific to a particular type of data (for example, company ABC's 3G network configuration data in .csv format) and describe how it is to be handled. For example, the provider specifies the adaptor to be used, how the date and time are to be generated, the field separator if relevant, the names of the fields in the input file, whether they are to be ignored and if not their data type, the name of the corresponding attribute in the database, how it is to be validated, etc. The handling of each field is specified using an AXEL statement. The data providers must be configured for every type of data that is to be loaded and stored in the Nexus database.

Data Adaptors. These are specific to a particular data format (.csv, fixed width, or XML) and read and parse data of that format.

Data Layer. Part of the Middle Tier, this provides a standardized way of communicating with the database.

When the NDLA console application is fired, the following occurs:

The NDLA console application is fired with the name of a data file and its provider.

The NDLA processor gets the named provider from the database.

The NDLA processor fires the adaptor specified in the provider and passes to it the named data file.

The adaptor returns to the provider the column headings found in the data file.

The adaptor iterates the rows in the data file. For each field in each row, the NDLA processor runs the AXEL specified for that field in the provider and builds up a staging table of data to be inserted into the database.

The NDLA processor initiates a bulk insert of the staging table into the database via the data layer.

Figure 7:
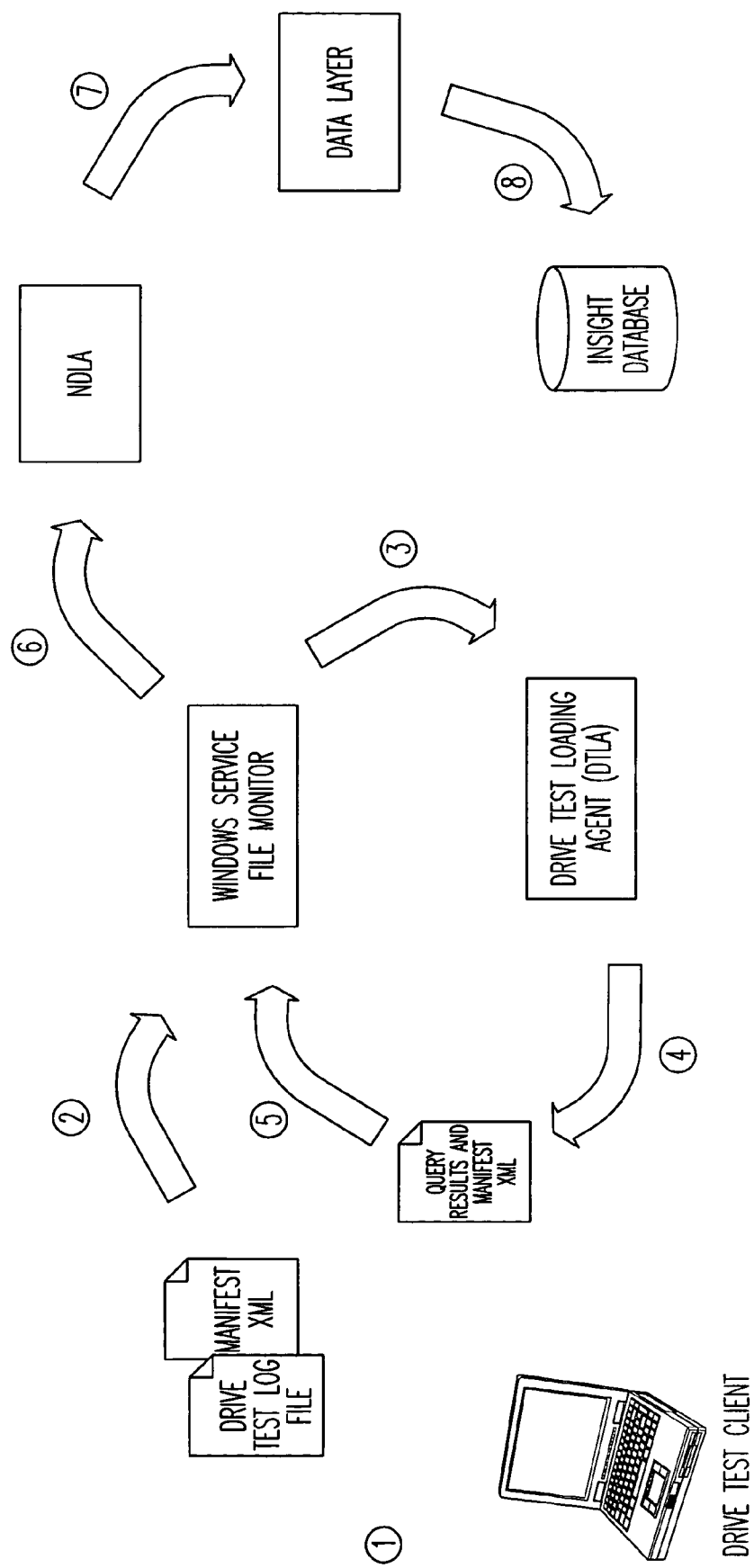
FIG. 7 shows the Drive Test Loading Agent (DTLA)

FIG. 7 shows the Drive Test Loading Agent (DTLA). The DTLA provides a mechanism for loading drive test log files into the system.

From the end user's point of view, all he or she has to do is to use the Drive Test Client to select the drive test log files that are to be loaded and to enter details about them, such as a description, the date and time of the drive, the engineer's name, the weather conditions, etc.

The Drive Test Client encapsulates the descriptive information into an XML file called the manifest. The Drive Test Client then copies the log file and its related manifest into a file location that is being monitored by the File Monitor Windows service, which is part of the Network Data Loading Agent (NDLA). However, instead of firing the NDLA, the File Monitor is configured to fire the DTLA when a new log file and XML manifest pair become available.

For each log file and XML manifest pair of files, the DTLA does the following:

Extracts the drive test dates from the XML manifest and retrieves the relevant site and sector information for those dates from the Nexus database.

Exports the site and sector information in the form of an Analyzer CellRefs file and sets this as the current Cell-Refs file.

Instantiates the FSD component and loads the crosstab queries that are to be used to summarize the data.

Loads the log file into the FSD.

When the file load is complete, the DTLA "runs" the specified crosstab queries and retrieves the resulting datasets.

Exports the query results and the manifest into an XML file, which is then dropped into a folder that is watched by the NDLA's File Monitor.

The exported file is then loaded into the Nexus database by the NDLA in the normal way. This requires that the File Monitor is configured to watch the folder where the DTLA drops the exported files and that a suitable data adaptor is available.

The middle tier is part of the Nexus platform and is a thin layer between the Nexus database and the engineering client. The middle tier includes a Web service-based application programming interface (API) and all communication between the engineering client and the database is handled by this API.

Behind the Web service is a data layer, which has two main roles:

It handles all of the communication with the database.

It provides standardized access to, and presentation of, the data regardless of the structure of the underlying database.

Figure 8A:
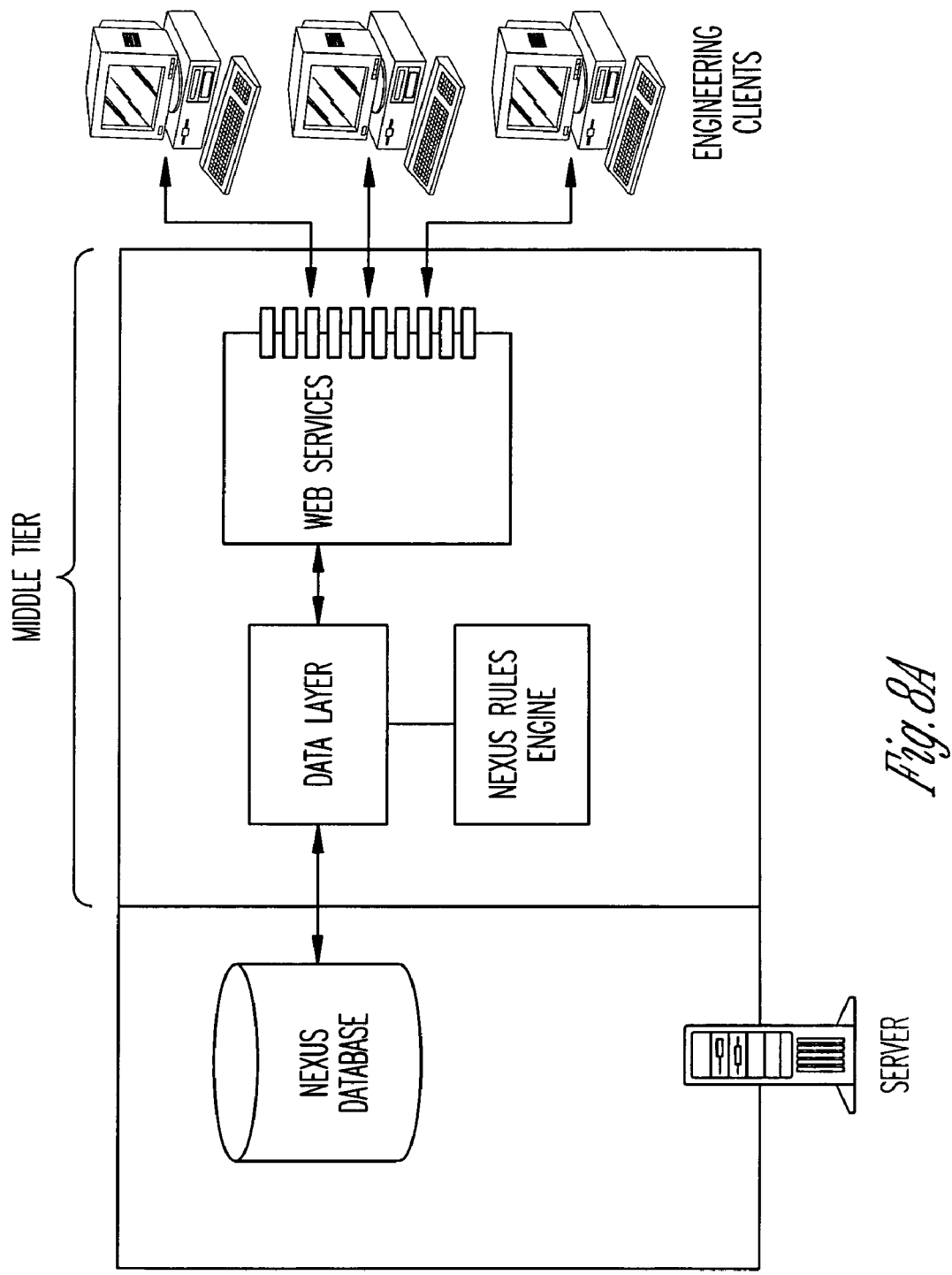
FIGS. 8A and 8B show implementations of the middle tier of the Nexus platform.

FIG. 8a shows the middle tier of the Nexus platform. To illustrate the operation of this tier consider what happens when the engineering client requires a list of sites and their KPIs:

The engineering client uses the middle tier's Web service API to request the list.

The Web service requests the list from the data layer.

The data layer retrieves the data from the database, presents it in a standard form and passes this to the Web service.

The Web service returns the data to the engineering client.

This architecture has several advantages. For example:

Independence from database implementation. The engineering client and other front-end applications are completely insulated from the database implementation. This means that the front-end applications will not need to change should it be necessary to add new database implementations. Nexus currently uses an Oracle database running under Linux. Other implementations could be envisaged by the skilled reader.

Easier deployment. Interactions with the database typically require various libraries to be installed on the local machine. Because the data layer handles all communication with the database, these libraries need to be installed on the server hosting the data layer only (rather than on every engineering client machine, for example). The data layer can be hosted on one or more different servers from the database itself.

Database licensing advantages. Because all connections to the database are made through the data layer, this architecture would have significant advantages should the database server application be licensed on a per-connection basis.

The middle tier may also cache data. For example, it might build a model of the user's mobile telecoms network, which would improved the performance of the engineering client and allows the whole system to be more scaleable.

Finally, the logic may be located in the middle tier. Separating the logic from the data and the user interface is good practice and means that the engineering client can be leaner and thinner than might otherwise be necessary.

Figure 8B:
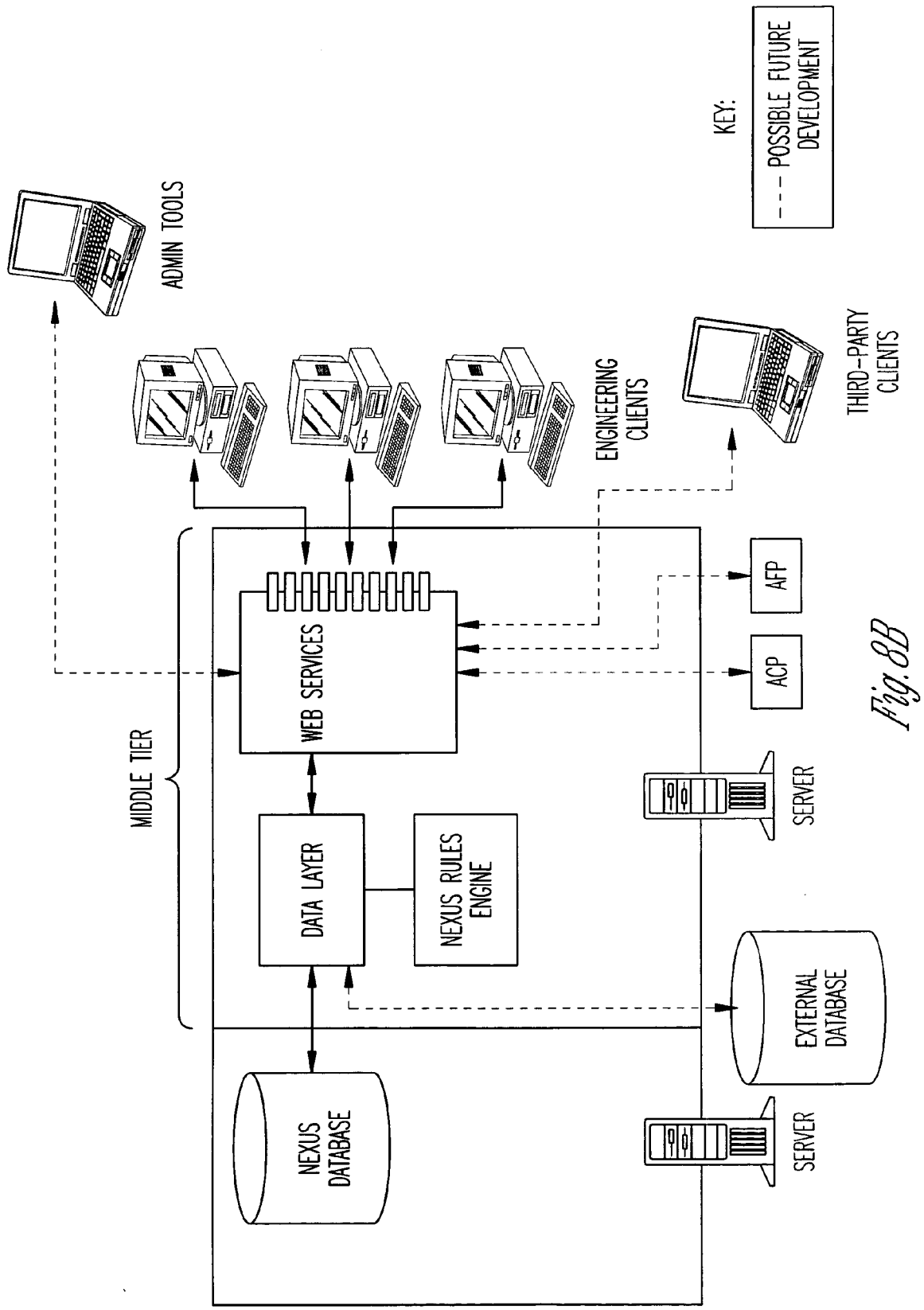

FIG. 8b shows an alternative implementation of the middle tier, which supports third-party clients. These would use the Web service API to communicate with the database, just as the engineering client does. Support for third-party clients would require a mechanism for authenticating clients who use the API. Similarly other systems are able to interact with the system, such as AFP and ACP, or other databases that hold sector-based KPIs.

Figure 9A:
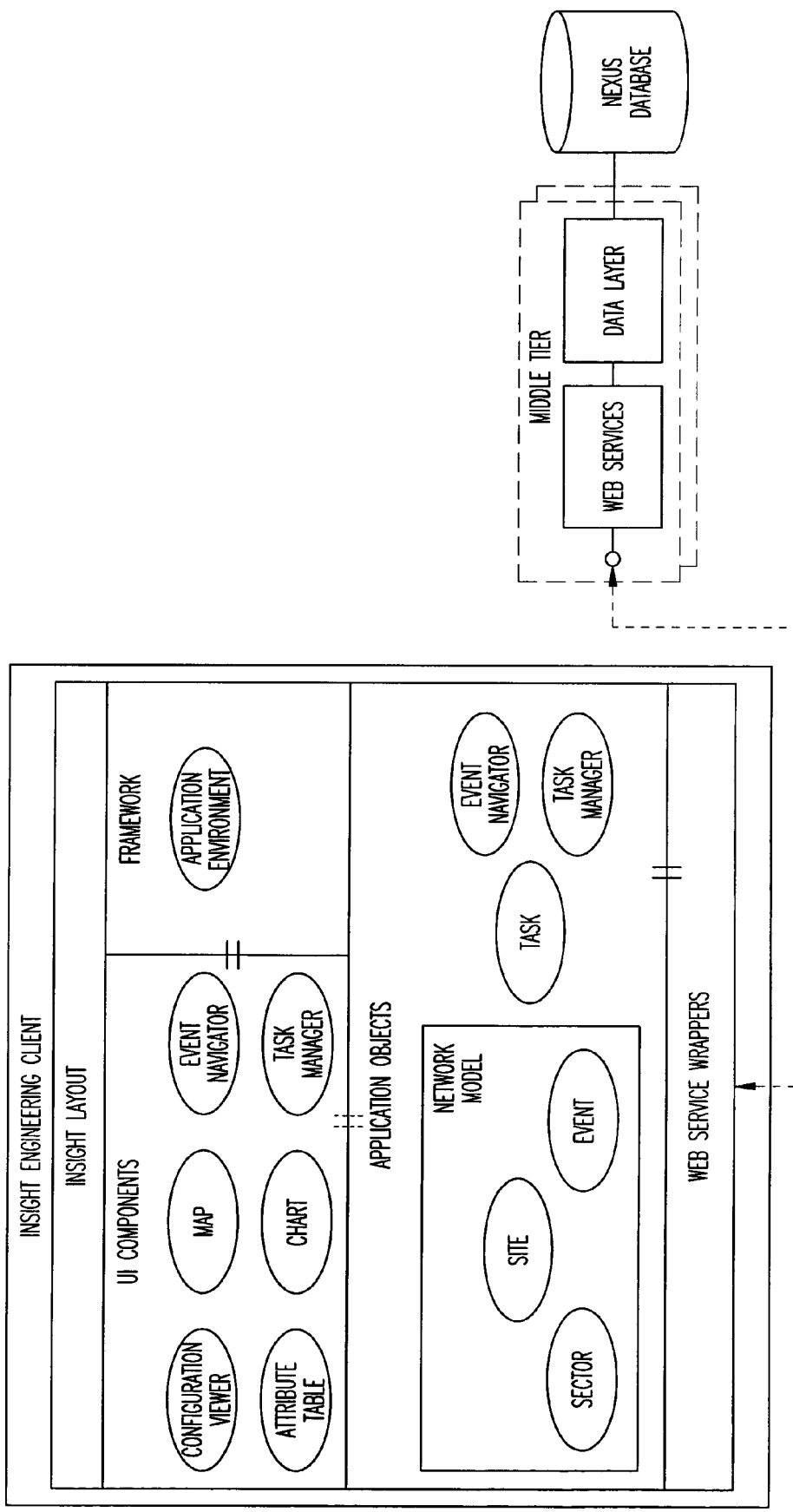
FIG. 9A provides a conceptual view of the engineering client's architecture.

To the user, the engineering client is the task and map-based tool that he or she uses every day. In embodiments the engineering client is a Windows .NET forms application. FIG. 9a provides a conceptual view of the engineering client's architecture.

In embodiments all communication between the engineering client and the database takes place through the middle tier's Web services, which provide a collection of methods for accessing the data across intranets and the Internet. However, the communication is handled by the engineering client's Web service wrappers. None of the other components within the engineering client need communicate with the Web services directly. This design makes it easy to set up unit tests to test the various components within the engineering client, because it is possible to substitute a "mock" object in place of the real Web services. This means that the components can be unit tested in an isolated environment, without all of the complications, dependencies and unknowns that are introduced when they are part of a complex system and data is being transmitted across the network. Each unit test sets up its own data within the mock object and use that within the testing of the component.

The application objects, also referred to business objects, are the logical building blocks of the engineering client. Some, such as the Network Model, Site, Sector, Event, and Task objects map to basic concepts within Insight and others, such as the Event Manager and Task Manager, control and manipulate the basic objects. For example, the Event Manager is responsible for retrieving the list of events and does this through the Web service wrappers. The Network Model is an object model representation that models the user's mobile telecoms network configuration. The Site, Sector, and Event objects are part of the Network Model and are always accessed through it.

On top of the Application objects are the UI components, such as the Attribute Table, Configuration Viewer, Event Navigator, Task Navigator, Map, Chart, etc. As their names suggest, these correspond to the various elements that you see on the screen in the engineering client and they interact with the application objects. For example, the Event Navigator UI component corresponds to the Event Log that is displayed on the screen and it interacts with the Event Manager object, which (as explained earlier) actually gets the events that are displayed.

The Map object corresponds to the map that is displayed on the screen. The system draws the standard map layers and then draws other layers on top. The upper layers allow additional information to be displayed.

Figure 9B:
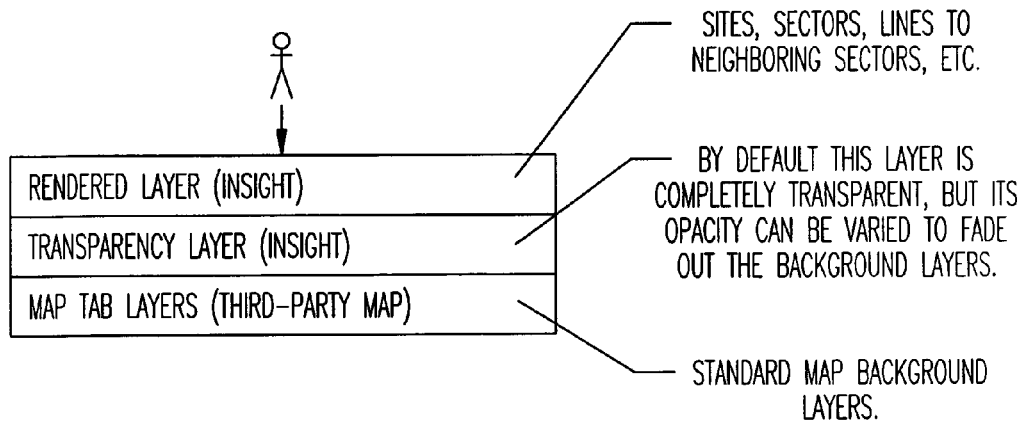
FIG. 9B shows the layered maps of the engineering client.

FIG. 9b shows the layered maps of the engineering client.

The Map object draws two system-specific layers:

Transparency layer. This is drawn immediately above the standard map background layers and by default it is completely transparent. By changing its opacity, the background layers can be faded out.

Rendered layer. This is the topmost layer and it is used to draw the sites, sectors, lines to neighbouring cells and other system-specific data.

The UI components communicate through the Application Environment object, which is the central manager of the engineering client framework—it handles the communication between the various UI components and handles their state. For example, the Application Environment object tracks which area, task, date, etc. is currently selected. When the user selects a different area, for example, the Application Environment object raises a "current area changed" .NET event. When the UI components detect this event, they update their displays accordingly.

On top of the UI components and the framework is the System Layout, which controls how the various UI components are arranged on the screen. Internally the System Layout is a container of .NET forms and it has a small amount of logic to handle what happens when a user opens the client for an area for which there are no tasks, for example. (Instead of opening on an empty Task List, it goes straight to the Explore Area tabs.)

The current selection represents what the user is currently dealing with. For example, it might be a single site or sector, a group of sites, or an area on the map that includes a number of different sites. It is the framework's responsibility to track the current selection and to communicate it to the map and plug-ins, so that when the user selects something else, this can be reflected on the screen.

In embodiments the framework always contains the map, but the plug-ins might vary, depending on the context. In embodiments the context simply defines how the map and the plug-ins are arranged on the screen. For example, there might be a context called KPI Navigator, which specifies that the screen should be arranged as shown in the following diagram.

Figure 9C:
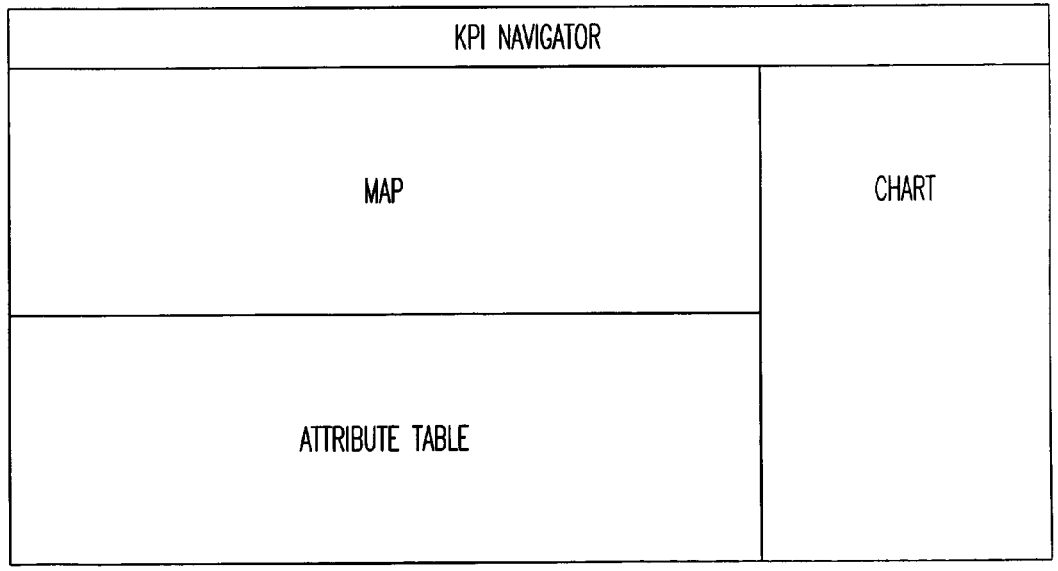
FIG. 9C shows an example layout displayed by the engineering client.

FIG. 9c shows an example layout displayed by the engineering client. The context may be extended to specify which attributes are relevant to the context. For example, a Neighbour List Tuning context might specify not only the plug-ins to be used and how they are arranged on the screen, but also a list of attributes that are relevant when users are configuring neighbour lists.

We shall now discuss the rules in more detail.

As explained above, the Nexus Rules Engine applies expressions called rules to the data in the Nexus database. For example, rules are used to create performance and configuration alerts and group them into reactive tasks, which then appear on the Task List in the engineering client. The present system uses an expression language called AXEL and are run in the Engine context, which provides access to the KPIs and the attributes in the Nexus database and a number of useful functions for raising events, creating tasks, finding network elements, etc.

The Nexus Rules Engine is extremely flexible and does not control what the rules are run against. Instead this is defined in the rules themselves. Although within the AXEL terminology, each rule is a separate expression, you can think of each rule as a script and it is up to the person creating it to define its flow. For example, it is possible to write a rule that specifies that it is to be run against the data for one particular sector only. However, it is more common to create rules that are run against all of the sectors in a particular area, or all of the sectors in all of the reactive optimization areas, or against all of the base stations that are connected to a particular OMC, say. This flexibility means that you could, for example, create one set of rules for use in dense urban areas and another set for use in a sparsely-populated rural areas, etc.

An example rule that is, for example, designed to be run daily for all of the reactive optimization areas is described as follows. The rule loops through every sector in each of the areas performing checks on a number of KPIs and raising performance alerts for any sectors that fail the checks. The checks might comprise delta checks, which look for changes in performance by comparing the current value with, for example, the average value over the previous three weeks. Alternatively the checks might simply compare the current value with a fixed threshold (these are called threshold checks). Delta check rules tend to involve heavier processing than rules that simply check performance against fixed thresholds.

If any performance alerts are generated for a sector, additional checks are performed on key radio statistics, which might result in the generation of further performance alerts. All of the alerts that are generated for a sector are then wrapped up into a single task. This avoids the traditional duplication that occurs when one task list is based on the top 10 sectors with the worst dropped call rate and another on the top 10 sectors with the worst call setup success rate, because frequently both problems have the same or a related root cause and so many of the same sectors appear on both lists. By creating a task for each sector that has a performance issue in any of these related areas, the engineer has all of the pertinent information available as soon as he or she opens up the task. In addition, some criteria, such as traffic statistics, can be used to generate a task priority, so that the sectors with the highest traffic are flagged up with the highest priority.

Checking the radio statistics only for sectors that have failed the sector-level checks makes the rule faster to run than checking the radio statistics for every sector. This is a useful technique in delta check rules that are run against very large volumes of data. However, the flexibility that is inherent in the Nexus Rules Engine means that these and similar choices are in the hand of the creator of the rules. There is sometimes a trade-off between picking up so many potential issues that your engineers do not have time to investigate them all and attempting to pick out only the most important issues at the risk of missing some. The rules can be tailored to meet the requirements of your network and to fit the hardware and other resources that are available. In addition, you can refine them in response to experience.

Rules that are designed to be run against a large amount of data are generally scheduled to be run overnight, with perhaps the performance alert rules being run every night and the configuration alert rules once or twice a week. But again the flexibility of the Nexus platform means that the frequency can be set to meet specific user requirements.

It is generally helpful to group rules into logical categories. Typically rules perform a number of checks on the data and raise events when the checks fail. Currently rules that generate events generally also generate tasks. They can do this in different ways. For example, a daily performance check rule might create a single task for every sector that fails any of the checks, and wrap up all of the events that are generated for the sector into that single task. This has the advantage that it avoids duplication and keeps all of the performance information for each sector that exhibits an issue together in a single task. A configuration check rule, on the other hand, might do something similar for each area rather than for each sector. However, it is also possible to group events into tasks in other ways or to create a separate task for each event.

Rules typically fall into the following logical groups:

Configuration check rules perform checks on network configuration data (also called planning data), which is stored in continuous attributes. Typically there are two types of configuration check rules:

Delta checks. These look for changes in the configuration and typically raise configuration alert events when significant changes are found. Typical changes might be new or deleted network elements, changes of configuration parameters, such as a new antenna mask, for example.

Audit checks. These compare the network configuration with the default or designed configuration and typically raise configuration alert events when discrepancies are found. For example, a rule of this type might check that sectors do not have more than a specified number of 2G neighbours and raise a configuration alert for any that do.

Performance check rules perform tests on network performance data, either by looking at the raw counters stored in discrete attributes or by looking at the KPIs that are generated from those counters. The flexibility of the Nexus Rules Engine is such that there is considerable scope for innovation in how you can implement performance check rules. However, typically performance check rules look at a set of KPIs that cover the service as a whole, using the industry standard approach of accessibility, retention, voice quality and capacity, with the addition of further checks that aim to provide additional information to enable diagnosis and prioritization of issues.

For example a common approach is the following:

High-level checks. Test the high-level KPIs that cover the key areas of accessibility, retention and voice quality. The important issue here is to identify the right high-level tests.

Additional analysis. If any of the high-level tests fail, perform additional tests on the underlying KPIs that can be expected to provide further analysis of the high-level issues.

Diagnosis. Use the additional tests to build up a matrix of information, which can then be searched for fault signatures and a potential diagnosis.

Set priority. Assign a priority value that reflects the overall importance of the issues that have been identified whilst taking into account any other relevant information. For example, the overall traffic on the associated network element might contribute to the priority, because elements with high traffic are generally more important commercially than those with low traffic. The priority value can then be used to set the priority on the task Deploy solution. The rules actually deploy a solution through interfaces to MML or the trouble ticket system. For example, when appropriate, the rule could initiate a reset and record this in the log Performance check rules are typically classified into two groups depending on the approach taken to the high-level checks:

Delta checks. These look for changes in performance over time (for example, over the previous three weeks) and raise performance alert events when significant changes are found. These rules are generally good at picking up new and sudden changes in performance. However, they may not identify network elements that have had poor performance for some time or those that exhibit a gradual decline in performance. For this reason, threshold checks are generally also required.

Threshold checks. These compare performance with hard limits and raise performance alert events when the limits are breached.

In practice a combination of delta and threshold checks are generally required. Design check rules perform checks on a combination of network configuration data and performance data.

Ad hoc rules can be used on an occasional or irregular basis to discover information about the state of the network (e.g. when performing proactive optimization). These rules might simply be used to display information rather than creating events and tasks. They might be created on a temporary basis or stored for future use.

Embodiments of the system uses an expression language the applicants call the Actix (RTM) Extensible Expression Language or AXEL (illustrated below). This has been developed to provide an easy way to configure the system. Because the system consolidates network operators' processes into a single streamlined application and does not dictate what those processes should be, each customer can have different attributes, KPI calculations and rules for creating events and tasks. This means that the system needs a flexible and extensible mechanism for quickly and easily tailoring the system to meet each customer's specific requirements. All of the logic used within the system needs to be completely adaptable to match each customer's KPI definitions and processes. AXEL has been developed to answer this need. It is used throughout the system to define the formulas that are used for validating data and defining KPIs and the rules for generating performance alert and other events and for combining them into tasks.

AXEL enables the rules to be constructed independent of any specific data source, it exposes a plug-in API for interfacing with different data sources, it supports code-based and expression-based function libraries. Furthermore, new libraries can be written against the AXEL API and added to the product without recompiling the core system, and users can write their own function libraries and save them as XML. These can then be used in the same way as the built-in functions. Users can also write custom implementations of core functions to extend or restrict functionality.

Example rules are shown below:

```
/*<Neighbor Handover Check >*/
declare numSectors      := 0;
declare numEvents               :=0;
declare numTasks                :=0;
declare window          := 21;
function OutgoingHandoverCount := Begin
        declare sourceSector    := #0;
        declare targetSector    := #1;
        declare count           := 0;
        for contextdate -> (contextdate – window) loop
                try
                        count = count + HO_Attempts[targetSector, #item];
                end;
        end;
        yield count;
end;
function IncommingHandoverCount := Begin
        declare sourceSector    := #0;
        declare targetSector    := #1;
        declare count           := 0;
        for contextdate -> (contextdate – window) loop
                try
                        count = count + HO_Attempts[targetSector, sourceSector, #item];
                end;
        end;
        yield count;
end;
AutoCacheAttributes(contextDate, ContextDate–window, attr_ho_attempts);
function DoSectorChecks := begin
        trace(format("Checking Sector {0}", contextelement));
        numSectors = numSectors + 1;
        declare neighbors       := FindNeighbourElements( );
        declare neighbor        := null;
        declare incommingCount          := 0;
        declare outgoingCount   := 0;
        for neighbors loop
                neighbor = #item;
                incommingCount          = IncommingHandoverCount(contextElement,
    neighbor);
                outgoingCount = OutgoingHandoverCount(contextElement, neighbor);
                Trace(Format("Handover count {0} Incomming = {1}. Outgoing = {2}.",
```

```
neighbor, incommingCount, outgoingCount));
                    if incommingCount + outgoingCount == 0 then
                            declare task := CreateTask(@"task_configuration alert",
Format("Unused neighbor {0} detected on sector {1}", neighbor, ContextElement));
                            numTasks = numTasks + 1;
                            declare event := RaiseConfigurationAlert(contextelement,
Format("Neighbor {0} has not had any handover attempts (incomming or outgoing) for {1} days",
neighbor, window));
                            numEvents = numEvents + 1;
                            AssociateEventWithTask(task, event);
                            AssociateElementWithTask(task, neighbor);
                    end;
            end;
end;
function DoAreaChecks := begin
        trace(format("Checking Area {0}", contextarea));
        for sectorsinarea loop
                SetContextElement(#item);
                DoSectorChecks( );
        end;
end;
//main execution loop;
if contextelementisset then
        DoSectorChecks( );
else
        if contextareaisset then
                DoAreaChecks( );
        else
                for findallareas(cat_Reactive) loop
                        SetContextArea(#item);
                        DoAreaChecks( );
                end;
        end;
end;
```

The above rule loops across all sectors and for every sector it uses the AXEL function FindNeighbourElements( ). For each neighbour element found a functions are called to count both incoming and outgoing handovers along the relationship definition over a period of time. The counts are summed and if found to be zero and task is then raised. The idea behind this rule is to identify neighbour relationships that were not being used and could therefore be removed.

A further example is shown below:

```
/*<Radio Checks >*/
///////////////////////// Global declarations /////////////////////////////
declare numSectors       := 0;
declare numEvents                := 0;
declare numTasks                 := 0;
AutoCacheChildElements(level_sector, cat_iden, level_radio, cat_iden);
AutoCacheAttributes(contextdate, contextdate −1, attr_carriernumber);
function DoRadioCarrierNumberChecks := begin
        declare sector                      := #0;
        declare radio                       := null;
        declare carrierNumberToday          := 0;
        declare carrierNumberYesterday      := 0;
        declare event                       := null;
        for FindChildElements(sector, level_radio) loop
                try
                        radio                   = #item;
                        carrierNumberToday      = carrierNumber[radio];
                        carrierNumberYesterday        = carrierNumber[radio, contextdate −1];
                        if carrierNumberToday != carrierNumberYesterday then
                                event = RaiseConfigurationAlert(sector, Format("Carrier
number for radio {0} has changed from {1} to {2}", radio, carrierNumberYesterday,
carrierNumberToday));
                                numEvents = numEvents + 1;
                        end;
                end;
        end;
end;
function DoSectorChecks := begin
        trace(format("Checking Sector {0}", contextelement));
        DoRadioCarrierNumberChecks(ContextElement);
end;
function DoAreaChecks := begin
        trace(format("Checking Area {0}", contextarea));
        for sectorsinarea loop
```

```
                SetContextElement(#item);
                DoSectorChecks( );
        end;
        declare radio   := null;
        declare sector  := null;
        for FindRemovedElementsInArea(contextArea, level_Radio, cat_iden) loop
                radio = #item;
                sector = FindParentElement(radio, level_sector, cat_iden);
                RaiseConfigurationAlert(sector, format("Radio {0} removed", radio));
                numEvents = numEvents + 1;
        end;
        for FindAddedElementsInArea(contextArea, level_Radio, cat_iden) loop
                radio = #item;
                sector = FindParentElement(radio, level_sector, cat_iden);
                RaiseConfigurationAlert(sector, format("Radio {0} added", radio));
                numEvents = numEvents + 1;
        end;
end;
// main execution loop
if contextelementisset then
        DoSectorChecks( );
else
        if contextareaisset then
                DoAreaChecks( );
        else
                for findallareas(cat_Reactive) loop
                        SetContextArea(#item);
                        DoAreaChecks( );
                end;
        end;
end;
```

As with the first example, the above rule loops over all sectors for a predefined area in this case performing configuration checks. The rule looks at the radios on each sector (using FindChildElements) an example of traversing the network hierachy. This rule is looking for radios that have changed their carrier number since yesterday and raises an event if it finds a change. The rule also looks for radios that have been added or deleted from the system. The aim is to provide an event layer on which correlation with other events can be performed in the rules engine and/or simply provide context for engineer investigating a task.

A further example is shown below:

```
// Check definition of 3G > 2G (adjw) with 2G > 2G (adce)
//declare NumNeighbours;
declare GSMNeighbours;
declare IRATNeighbours;
declare EquivGSMSource;
declare IRATNeighbour;
declare GSMNeighbour;
function neighbourfinder:= begin
        //NumNeighbours = 0;
        Declare Skip:= false;
        //find the gsm neighbours for the contextelement (which is cat_wcmda carrier 1)
        IRATNeighbours = findneighbourelements(cat_gsm);
        // Get the equivalent GSM source for the context element
        declare theparent:= findparentelement(contextelement, level_site);
        declare otherchild:= findchildelements(theparent,Level_Sector,cat_gsm);
        //yield otherchild;
        declare thesector:= substring(format("{0}",contextelement),7,1);
        //yield thesector;
        declare thissector:=null;
        if any((thesector == "a"), (thesector == "b"), (thesector == "c"), (thesector == "e"),
(thesector == "f"), (thesector == "g") ) then
                thissector = thesector;
        else
                if any((thesector == "A"), (thesector == "B"), (thesector == "C"), (thesector ==
"C"),(thesector == "D"),(thesector == "E") ) then
                        if thesector == "A" then
                                thissector = 'a'
                        end;
                        if thesector == 'B' then
                                thissector ="b";
                        end;
                        if thesector == "C" then
                                thissector = "c";
                        end;
                        if thesector == "E" then
```

```
                                thissector = "e";
                        end;
                        if thesector == "F" then
                                thissector = "f";
                        end;
                        if thesector == "G" then
                                thissector = "g";
                        end;
            Else
                        Trace(format("Sector is crazy!? {0}", thesector));
                        Skip = true;
                end;
        end;
        if not skip then
        for otherchild loop
                declare otherchildstring:= format("{0}",#item);
                if contains (otherchildstring, thissector) then
                        EquivGSMSource = #item;
                end;
        end;
        // Probably want to check to see if the azimuth for the two sectors (to see if the are
aligned).
                try
                        Declare Azimuth1:= azimuth[findchildelements(contextelement,level_antenna)];
                        Declare Azimuth2:=
Azimuth[findchildelements(equivGSMSource,level_antenna)];
                        Trace(format("Azimuth of {0} is {1}, Azimuth of {2} is {3}", contextelement,
azimuth 1, equivGSMSource, azimuth2));
                catch
                        Trace(format("No Azimuth info available."));
                end;
                // Get the neighbours for the equivalent source
                        try
                                GSMNeighbours = findneighbourelements(EquivGSMSource, cat_gsm)
                        catch
                                trace(Format("No Such Source"));
                                Skip = true;
                        end;
                // Now check each IRATNeighbour against GSMNeighbours (Neighbours for the
Equivalent Source)
        if not skip then
                for IRATNeighbours loop
                        IRATNeighbour = #item;
                        declare IRATNeighbourString := format("{0}",#item);
                        //trace (format("Searching for equivalent of IRAT pair: {0} > {1}; equivalent {2} >
{3}", contextelement, #item, EquivGSMSource, #item));
                        declare index:=0;
                        declare found:= false;
                        declare missingtarget:=null;
                        for GSMNeighbours loop
                                declare GSMNeighbourString := format("{0}",#item);
                                //Trace(format("Checking {0} against {1}", IRATNeighbour, #item));
                                if IRATNeighbourString == GSMNeighbourString then
                                        found = true;
                                        missingtarget = #item;
                                        //Trace(format("found equivalent neighbour for {0}", #item));
                                end;
                        end;    // gsmneighbours loop
                        if not found then //check usage and if there is any usage then write message
                                try
                                        declare usagevalue:=0;
                                        declare avgusage:= 0;
                                        declare numer:=0;
                                        declare denom:=0;
                                        declare window:= 14;
                                        For ContextDate – window -> ContextDate – 1 loop
                                                try usagevalue =
getvalue(attr_attempts,iratneighbour,#item);
                                                        denom = denom + 1;
                                                        numer = numer + usagevalue ;
                                                        end;
                                        end;
                                        if denom <> 0 then
                                        avgusage = numer/denom;
                                        Trace(format("Could not find equivalent neighbour for {0} -> {1}.
Potential missing neighbour is {2} -> {3}", contextelement, iratneighbour, equivGSMsource,
iratneighbour));
                                        Trace(format("Average Usage is: {0} (for {1} / {2} days)",
avgusage, denom, window));
                                        end;
```

```
                    end;
                end;
                found = false;
        end;    //IRATNeighbours loop
    end; //skip
End; //skip
end; //neighbour finder
Trace(format("Starting {0}", now));
for FindSectorsInArea(@'cat_wcdma carrier 1') loop
setcontextelement(#item);
trace (format("Checking IRAT versus GSM Neighbours for {0}", contextelement));
neighbourfinder(contextelement);
end;
Trace(format("Finish {0}", now));
```

The above example rule allows an engineer to compare the usage statistics of mobility between technology layers to determine if mobility relationships are missing between similar layers. The rule loops through all the sectors in one technology layer and finds a specified type of neighbour relationships (in this instance 3G>2G). The rule then uses network hierarchy (findparentelement) to find the site and back down the hierarchy to find the equivalent GSM sector. Once the specified relationships are found for this sector (2G>2G in the example) the two lists of neighbours are compared against common tuples. Where a relationship exists for the former layer but not for the latter, a check is made to see if the relationship is used and if so a message is written with supporting information to alert the engineer. This is a good example of an ad-hoc rule and in this case the rule simply output the results to a text format.

Mobile Phone Network Optimization System to Implement a Self-optimizing Network

The techniques we describe are especially useful for 4G mobile phone networks, which require a much larger number of cells than present mobile phone networks and to provide high data rates/low latency (low ping time). As well as high level performance data, typically in the form of statistics, remotely scheduled and controllable measurement data is also available from mobile phone networks.

Mobile phone networks include an Operation and Maintenance Centre (OMC) which collects statistics from network infrastructure elements such as base stations and switches and compiles these into a database. This provides network operators with a high level view of the network performance and, for example, an OMC typically includes counters for every dropped call split out by cells and time. Other high level data on how a network is performing can be obtained from call detail records (CDRs) and SS7 (Signalling System No. 7) data. However because this data is at a relatively high level it is of limited usefulness in trouble shooting/optimization. (The skilled person will understand that some networks may use a different term to OMC to describe the function of the operational and maintenance centre, but this function is nonetheless still provided.

The techniques we describe are remotely schedulable and controllable switched-based measurements. The triggering, filtering and scheduling of GPEH (and similar protocols) enables simple and cost-effective collection of detailed diagnostic data, although in embodiments of the techniques we describe data from probes, protocol analyzers, and/or drive testing may additionally or alternatively be employed. The use of this type of data facilitates dropped call diagnosis, neighbour list analysis and other trouble shooting and optimization. We will describe the use of switch-based measurements, which in this context means any data collected by the network containing measurement reports and/or protocol messages; it does not include counter data. Switch-based measurements fall into two categories: aggregate measurement data and (super) calltrace data. Aggregate data typically comprises cell-based statistics derived from measurements, for example Ericcson™ FAS and MRR; in the main this is relevant only to 2G networks, and super calltrace is preferred. Super calltrace data contains raw protocol messages and measurements for a subset of calls/mobiles. This extends existing IMSI calltrace by allowing features such as triggered logging and scheduling of measurements on many mobiles. Examples include Ericcson™, GPEH/R-PMO and Lucent™ PCMD; existing aggregate measurement data may be derived from super calltrace data.

We describe the use of a combination of performance data and commissioned measurement data for automatic fault-finding, problem-solving and network optimization. However the techniques can also be used to map very high level parameters down to a lower level to effectively provide a lever. The techniques we describe can also be used to control a mobile phone network to optimize towards a business goal at a "CEO understandable" level by mapping one or more centrally mandated parameters such as a relative priority allocation strategy for different traffic types to a set of performance goals towards which the network then optimizes by controlling a low level configuration of the network, for example radio resource allocation, switch configuration and the like.

Figure 10A:
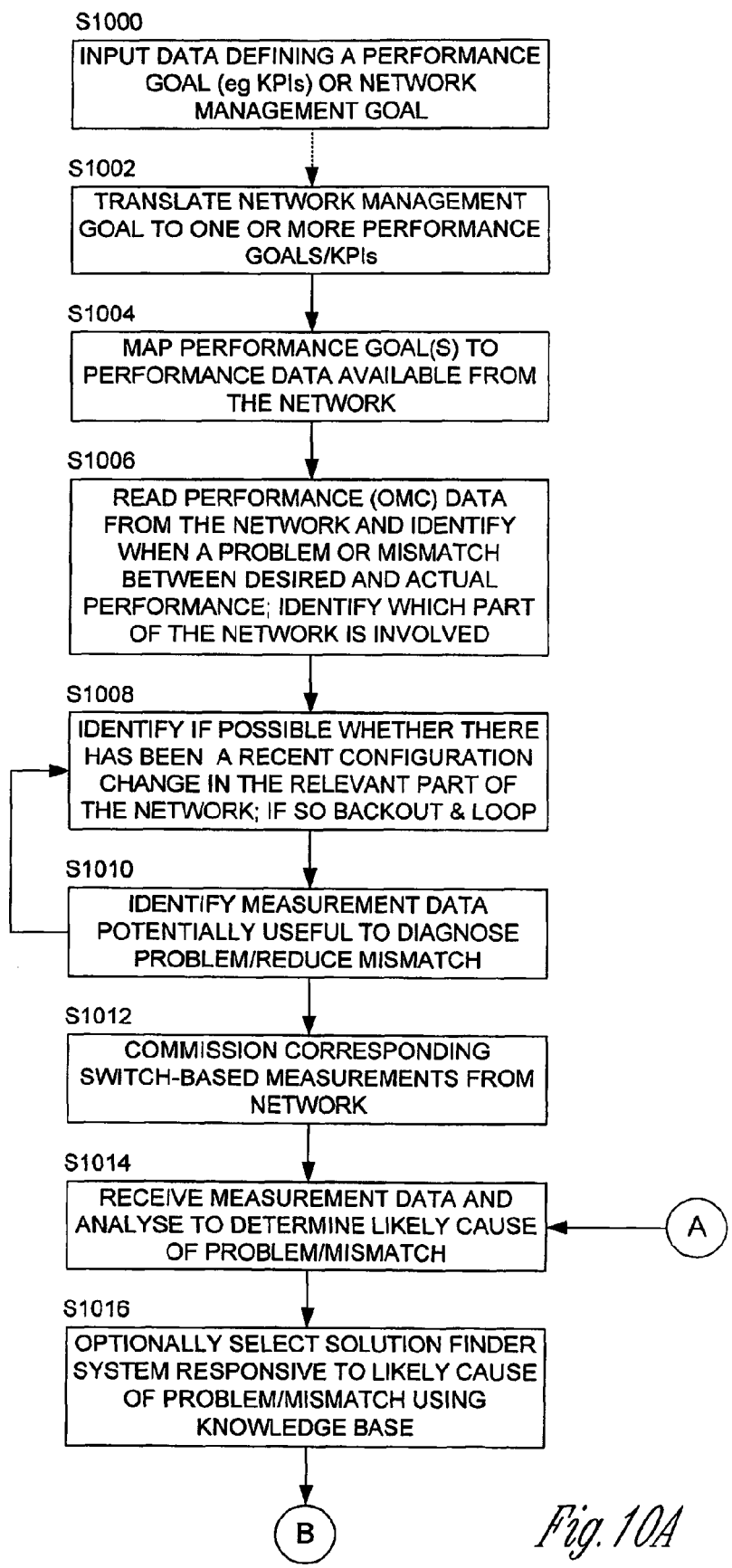
FIGS. 10A and 10B show a flow diagram of a procedure to implement a mobile phone network optimization system according to an embodiment of the invention.
Figure 10B:
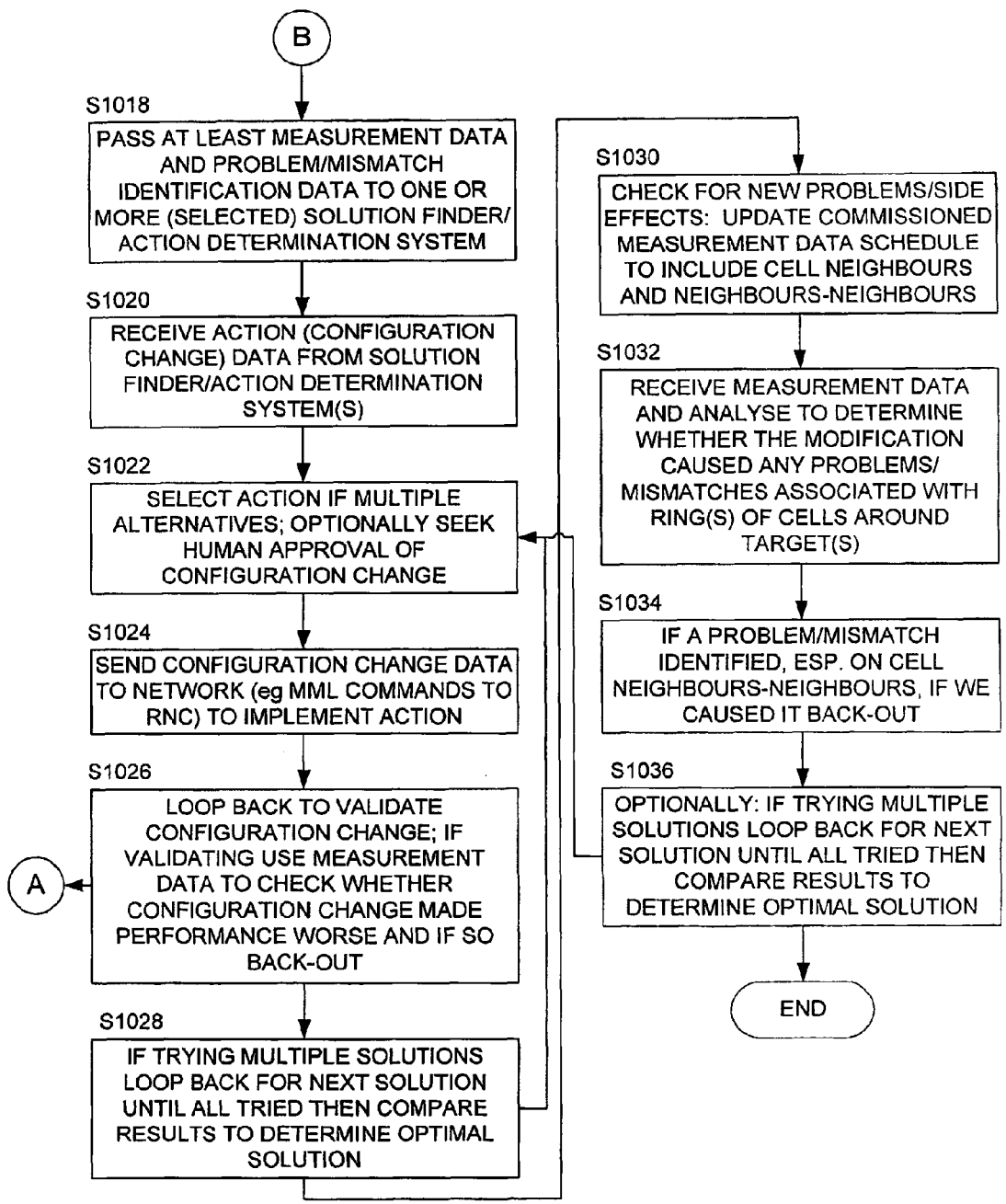

Thus, referring to FIGS. 10a and 10b, a procedure implemented by this system begins with an optional step S1000 of inputting data and defining a network management goal which is then translated (S1002) to one or more performance goals for the network, preferably expressed in terms of KPIs (Key Performance Indicators). The skilled person will be aware of the many typical KPIs which are used for a mobile phone network. Alternatively, at step S1000 data defining a performance goal, for example in terms of KPIs, may be input directly. A further optional step S1004 maps the performance goals to performance data available from the network where, for example, this is not already available as KPIs.

At step S1006 the system then reads performance (OMC) data from the network and identifies when a problem or mismatch between desired and actual performance exists, also determining which physical and/or logical part of the network is involved—typically an issue will be restricted to an area of the network and/or group of calls and/or group of mobiles. In preferred embodiments one type of performance mismatch which is identifiable is a trend identification event, that is change and performance over a period which may be one or more days, weeks or months (as described above) for example based on a network element signature and/or collating a number of performance mismatch identification events into a trend.

If a correlation of a change in performance with a change in configuration of the network can be identified, as described above, then there is a high probability of a causal link. Thus in preferred embodiments the method identifies, at step S1008, whether there has been a recent configuration change in the relevant part of the network, using the techniques described above, and if there is sufficient data to identify a correlation between the performance change and the configuration change then the configuration change is backed out and the procedure loops back to step S1006 to check that the issue has been resolved. If, however, the issue cannot be fixed in this way the procedure then continues.

At step S1010 the procedure next identifies measurement data which is potentially useful to diagnose the problem/reduce the identified mismatch. In preferred implementations this is performed by a rule running on the Nexus rules engine of FIG. 3. In embodiments a simple rule may be employed to collect more detailed measurement information relating to the area(s)/call(s)/mobile(s)/network element(s) to which the performance problem/mismatch relates, in order to diagnose the fault. Broadly speaking, therefore, the automated performance management system described above (referred to by the inventors as Insight™) identifies a performance problem/mismatch and if no (configuration change) cause can be identified commissions measurements from the network in order to make a diagnosis.

Thus at step S1012 the system commissions switch-based measurements from the network in order to capture the information desired to make a diagnosis, via a suitable interface to the network—for example in the case of Ericsson hardware GPEH is used to commission measurements using management interfaces (Mun, Mur and Mub).

At step S1014 the system receives the commissioned measurement data, typically via the same interfaces and analyses this data to determine a diagnosis, that is a likely cause of the problem/mismatch. This analysis may be performed by an engineer via a terminal but preferably the analysis is partly or wholly automated. In embodiments the analysis is performed by making available the measurement data to an analyzer such as the Actix (RTM) Analyzer details of which may be found, for example, in WO 2005/086418 (hereby incorporated by reference), although the skilled person will be aware that other analyzers are also available, for example from Tektronix™.

Having determined a likely cause of the problem/mismatch the procedure then passes data to a solution finder system; in embodiments, however, a solution finder system may be identified (step S1016) based upon the problem diagnosis/cause, for example using a knowledge base which matches causes to solution finder systems. Preferably an automatic optimization system is employed; a preferred example is the Actix™ Radio Plan™ system as described for example in WO 2004/075050 and U.S. Pat. No. 7,353,160 (both hereby incorporated by reference in their entirety), although the skilled person will be aware that other systems are available and are also described in the literature; one of the solution identification systems may also comprise a terminal to enable an engineer to investigate the measurement data to identify a solution.

The data that is passed to the solution finder system (S1018) comprises at least the measurement data and data identifying the problem/performance mismatch; optionally the higher level performance data may also be provided; preferably relevant configuration data for the network is also provided (that is, parameters of the network/network elements associated with the problem/mismatch).

At step S1020 the system receives action data from the solution finder (action determination) system(s), preferably in the form of data identifying one or more recommended configuration changes to the network/network elements (although the action might be that no configuration changes are recommended). Embodiments of the system may be configured to select an optimum configuration change from a number of alternative recommended configuration changes either from a single or from multiple solution finder systems. The measurement data, for example GPEH data, is relatively rich, and there are many network configuration parameters which may be altered, and therefore multiple courses of action may be available. Embodiments of the system may be configured to select, for example, the cheapest solution (however measured) or the solution which minimizes "side effects" of the parameter changes. This is discussed further later. Optionally at step S1022 human (engineer) approval of a proposed configuration change may be sought. The procedure then (S1024) sends the configuration change data to the network, for example in the form of MML (Man-Machine Language) commands to the RNC, to implement the change. The system then loops back (S1026) to step S1014 to retrieve further measurement data to validate the configuration change. If step S1026 is reached on the second time around the loop, that is during the validation pass, then the measurement data is employed to check whether the configuration change improved the performance/mismatch, if not backing out the change.

If multiple solutions are being tried then at step S1028 the procedure loops back to step S1022, collecting measurement data for each configuration change made and comparing the results to determine the optimal solution, for example the one that best reduces the mismatch between the desired and actual performance. The procedure then continues (S1030) to check for any new problems or side effects which may have been caused by the network configuration change. Thus at step S1030 the procedure updates the commissioned measurement data schedule to include neighbours and neighbours' neighbours of cells for which parameters have been changed. The measurement data received from these cells is then analyzed (S1032) as before to determine whether the modification caused any problems or mismatches associated with one or more rings of cells around the target area. If a new problem/mismatch is identified (S1034), the diagnostic information is examined to determine whether the configuration change to fix the original problem/mismatch caused this, and if so the change is backed out. If not the procedure continues and again if multiple solutions are being tried there is an additional optional step (S1036) to try the next solution before comparing the results (the comparison of different solutions may be performed at step S1028 or at step S1036).

In embodiments the configuration data comprises network configuration parameters and the configuration change can be implemented automatically by sending data to the network. As well a parameters such as timers and the like parameters may also include antenna type, tilt and azimuth and pilot power; antenna, tilt and azimuth are generally manually adjusted although automatic (remote) antenna control units are also available. A recommended configuration change may also comprise a recommendation to add capacity to the network, for example base stations or backhaul bandwidth; in such a case automatic optimization of the network may include a constraint on an amount of to invest in the network infrastructure. A process of trying multiple solutions may include selecting substantially at random from potential solutions, for example as part of a "simulated annealing" procedure.

Embodiments of the system may derive performance data, for example for use by a solution finder system, from commissioned measurement data. This may be done by modelling states of elements of the network by state machines and then by requesting as measurements messages which affect the modelled state machines, and choosing not to request unnecessary measurement data (messages). A process of modelling using state machines is described in our international patent application WO 2005/086418. More generally, the system may model one or more parts of the network by using state machines to define states of network entities and by capturing measurement data from, say, interfaces within the network, using these state machines to diagnose the cause of a problem/mismatch and/or to identify a potential solution. Thus, for example, a state of a network element may be effectively re-created by reading and understanding protocol messages on the network and controlling a state machine accordingly.

We will now further describe a preferred implementation of a mobile phone network optimization using a workflow engine to schedule tasks and a rules engine (as described above) to identify patterns in performance data. It is helpful for understanding the invention to briefly outline a generic structure of a 3G mobile phone system 100, as shown in FIG. 11*a*.

Figure 11A:
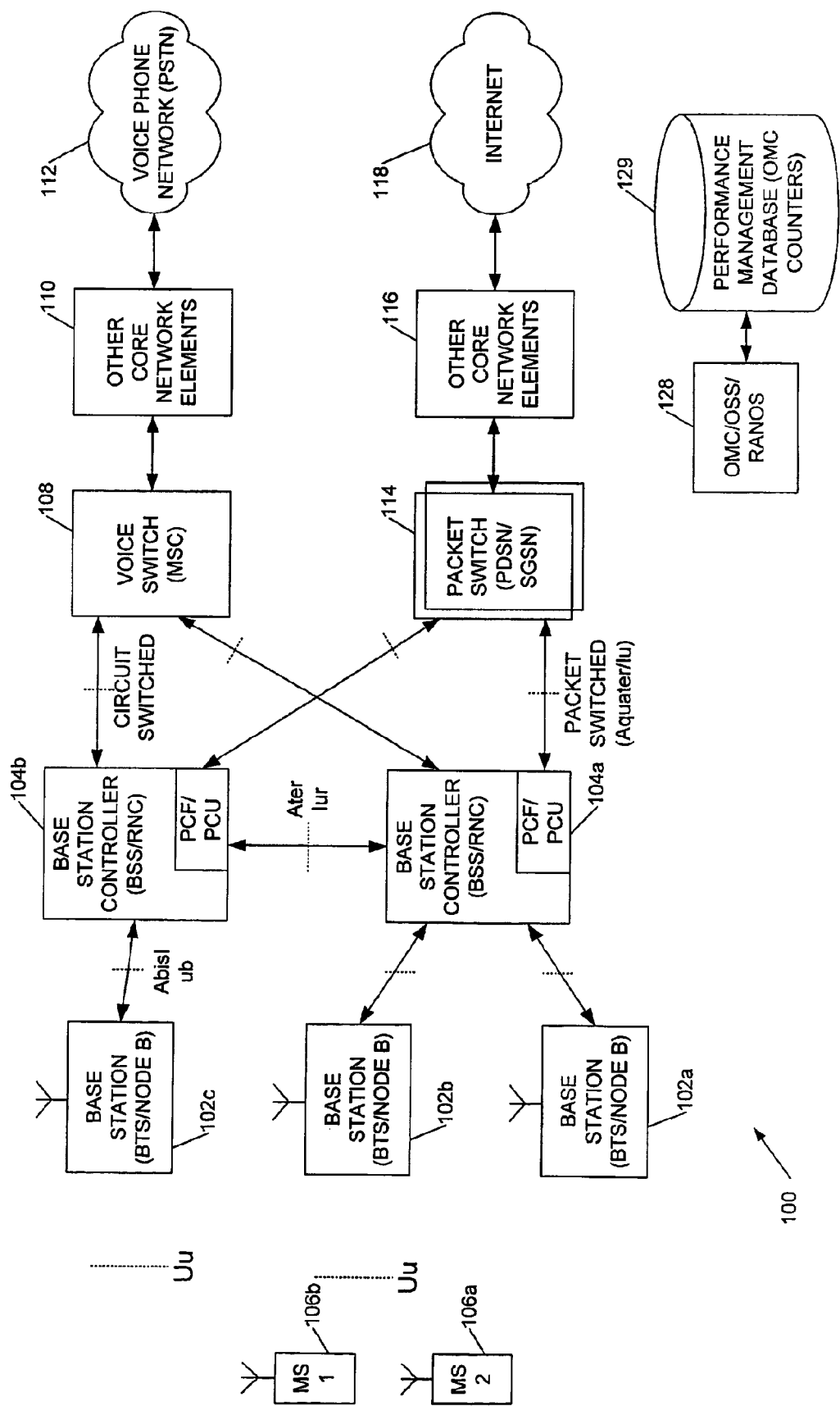
FIGS. 11A and 11B show, respectively, a simplified block diagram of a generic mobile phone network, and block diagram of a mobile phone network optimisation system according to an embodiment of the invention.

Referring to FIG. 11*a*, the network has a plurality of fixed base stations 102*a-c* referred to as base transceiver stations (BTS) or node B's each coupled to a respective base station subsystem 104*a,b* comprising a base station controller (BSC) or radio network controller (RNC) and a data packet control function (PCF) or packet control unit (PCU). Voice traffic is passed via a circuit switched connection to one or more voice switches 108 such as a Mobile services Switching Centre (MSC) and data traffic is passed via a packet switch connection to one or more packet switches 114 such as a PDSN (packet data switch node) or SGSN (serving GPRS support node). The voice switch(s) 108 connect via other core network elements 110 to a voice phone network such as PSTN (public switched telephone network) and the packet switch(s) 114 connect via further core network elements 116 to the Internet 118. Mobile stations 106*a,b* attach to one or more of the base stations. A very large number of interfaces are defined of which just a few are shown. The network includes an OMC/OSS/RANOS 128 coupled to a performance management database 129 storing accessible performance data such as OMC counters and the like. The terminology used for the different network elements varies depending upon the type of network and in this specification the use of particular terminology, for convenience, does not imply limitation to any specific type of network.

Figure 11B:
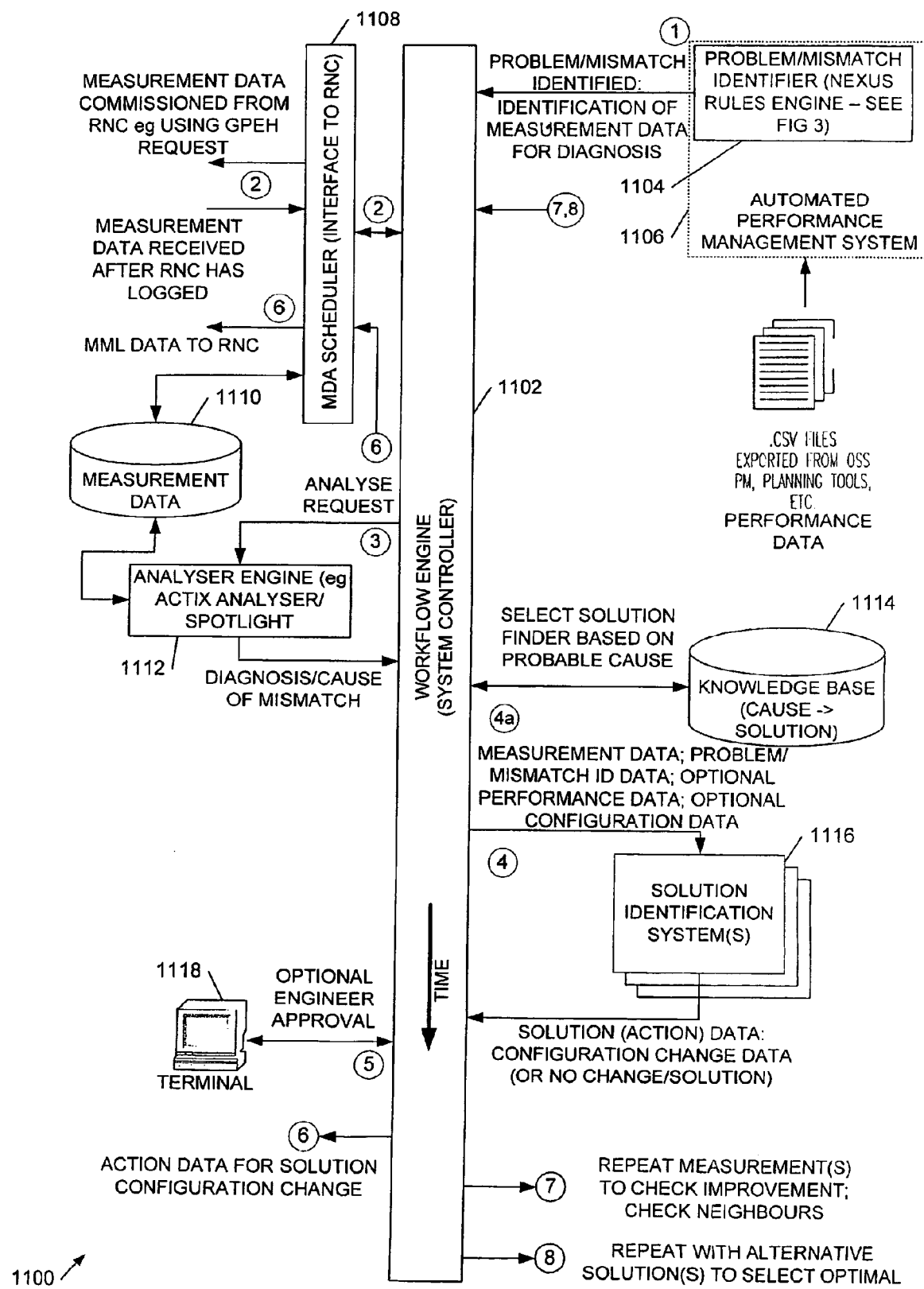

Referring now to FIG. 11*b*, this shows a mobile phone network optimization system 1100 according to an embodiment of the invention. The system comprises a workflow engine 1102 which acts as the system controller, coupled to a rules engine 1104, in preferred embodiments implemented using the Nexus rules engine described above, which acts to identify a performance problem/mismatch and to identify information relevant to this which should be collected in order to diagnose the cause. The rules engine is, in embodiments, part of an automated performance management system (Insight) 1106 as described above; this receives performance data such as .CSV files exported from OSS, PM, planning tools and the like. The workflow controller 1102 is also coupled to an interface 1108 to the network, in embodiments at the RNC-level. The interface 1108 may be implemented in many ways but may, in embodiments, be implemented by a further rules engine to translate a requirement for measured information to appropriate commands to the network to commission switch-based measurements to obtain the desired data. Conveniently, the MDA (measured data analysis) Scheduler of the Actix CellOpt Automatic Cell Planning System may be employed; this couples to a wide range of mobile phone networks and enables measurements to be commissioned and measurement results to be input.

The system 1100 also includes a database 1110 for storing measurement data obtained from the network and for making this data available to other systems, in particular analyzer engine 1112. Analyzer engine 1112 is also coupled to workflow engine 1102*a* and provides facilities for post-processing captured measurement data. A range of suitable tools are available but a particularly preferred analyzer engine is provided by Actix Analyzer™, preferably in combination with Actix Spotlight™. In embodiments a knowledge base 1114 is also coupled to workflow engine 1102, the knowledge base storing information to link a diagnosed cause of a performance mismatch with information identifying an appropriate solution identification system thus one or more solution identification systems 1116 are coupled to workflow engine 1102 and receive measurement (and other) data from the workflow engine; alternatively measurement data may be received directly from measurement database 1110. Examples of solution identification systems have already been described; they may include one or more automatic optimization systems (and may include an automatic optimization system of the network operator) as well as optionally one or more terminals for interfacing with a human user (engineer). One or more further engineer terminals 1118 may also be provided, for example for obtaining engineer approval of a proposed network configuration change.

In FIG. 11*b* workflow engine 1102 schedules operations in the numerical sequence indicated by the numbers within circles, time generally flowing from the top towards the bottom of the diagram. Thus at stage 1 the rules engine 1104 identifies a problem with the network or a mismatch between desired and actual performance, and identifies desirable measurement data for diagnosing the problem and passes this information to the workflow engine 1102 which in turn, via MDA scheduler 1108 then commissions appropriate measurement data from the RNC, for example using a GPEH request. Potentially other types of measurement data, for example drive test data, may also be commissioned, although this is not desirable as such an arrangement could not be fully automated and would create a substantial delay in the time line of dealing with a problem.

Thus at stage 2 measurement data is commissioned from the network and received back from the network, and stored in database 1110 where, at stage 3, it is processed by analyzer engine 1112 to determine one or more probable causes of the problems/mismatch. Optionally, at stage 4*a*, an appropriate solution identification system may be chosen dependent on the suspected cause of the problem. Then, at stage 4, measurement data, data identifying the problems or mismatch and, optionally, performance data and current configuration data are provided to one or more solution identification systems, which in turn output data identifying a solution, that is an action more particularly a configuration change to be implemented. Engineer approval for the change may be obtained at stage 5 by a terminal 1118 and then workflow engine 1102 provides the data for the configuration change to MDA scheduler 1108 which, in this example, provides data for the configuration change as MML commands to one or more RNCs.

Preferably the system 1100 is a closed loop system, so that once a configuration change has been made further measurement data is collected to check that there has been an improvement in network performance, a further closed loop then checking neighbours and, preferably, neighbours' neighbours of cells to which the configuration change has been applied, to check that the configuration change has not caused any substantial deterioration in network performance outside the logical or physical region (areas/calls/mobiles) to which the configuration change has been applied. In embodiments a still further closed loop may successively try a number of alternative solutions to the identified problem/mismatch in order to select one of these, for example according to a figure of merit function. This is advantageous is because although a solution identification system may be able to find a configuration change which should improve performance of the network, it may not know or have sufficient data to be able to evaluate what is the best solution.

Figure 12:
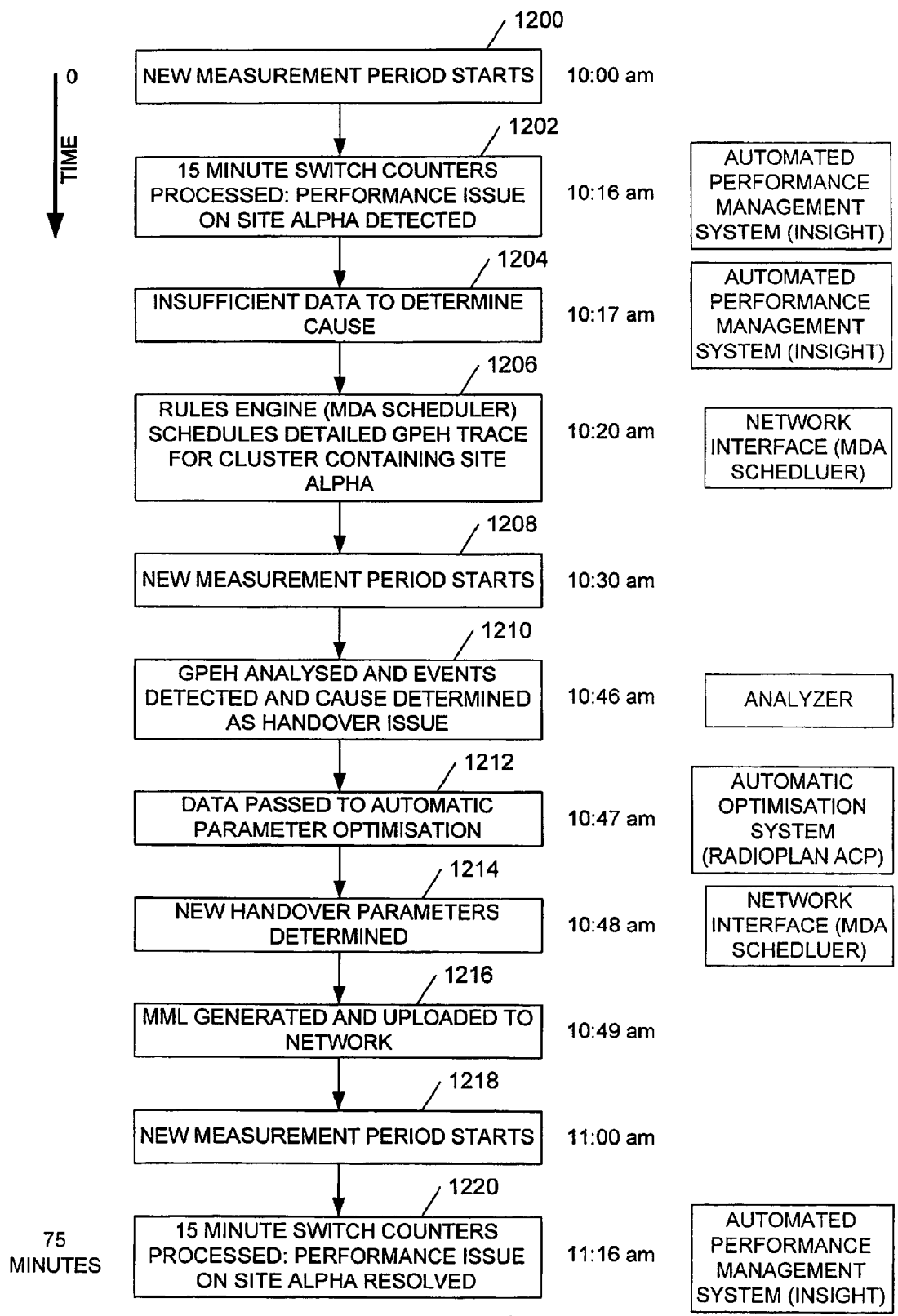
FIG. 12 shows a timeline of an example job illustrating operation of a mobile phone network optimization system according to an embodiment of the invention.

Referring now to FIG. 12, this shows an example of the mobile phone network optimization system 1100 in operation, illustrating fully automatic identification and resolution of a problem within a 75 minute period, showing how embodiments of the system we describe can be employed to provide a fully automatic, closed-loop self-optimizing mobile phone network.

In the example job a new measurement period starts 1200 and fifteen minutes later data from fifteen minute switch counters is processed 1202 and a performance issue on site alpha is detected. It is determined 1204 that there is insufficient data to determine the cause and therefore 1206 the rules engine (MDA scheduler) 1108 schedules a detailed GPEH trace for the cluster containing site alpha. A new measurement period starts 1208 at the next fifteen minute boundary and fifteen minutes later the GPEH is received and analyzed 1210 and events within the data are detected and the cause of the problem determined as a handover issue. Then the GPEH data is passed 1212 to an automatic parameter optimization system and shortly afterwards new handover parameters are determined and received back 1214 and then appropriate MML data is generated and uploaded to the network 1216. A new measurement period starts 1218 at the next fifteen minute boundary and fifteen minutes later data from fifteen minute switch counters is received and processed 1220, showing that the performance issue on site alpha has been resolved.

The skilled person will understand that the above-described techniques are applicable to all major wireless standards, including 2G (GSM, CDMA, iDEN), 2.5G (GPRS, EDGE) 3G (UMTS, HSDPA, HSUPA, CDMA-1X & EVDO) and 4G (WiMAX, LTE, TDD) technologies.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A mobile phone network optimisation system to control at least part of a mobile phone network in response to performance data from said mobile phone network to optimise performance of the mobile phone network towards a performance goal, the system comprising:
   a first interface to receive said performance data from said mobile phone network, said performance data comprising aggregated data for a plurality of calls;
   a second interface to commission measurement data from said mobile phone network and to receive said commissioned measurement data, said measurement data comprising data logged for a plurality of mobile phones of said network;
   a third interface to provide configuration data to said mobile phone network for changing a configuration of said network;
   a performance monitoring system coupled to said first interface to identify a mismatch between said performance goal and performance of said mobile phone network represented by said performance data, and to provide mismatch identification data for said mismatch responsive to said identification;
   a measurement data request system coupled to said second interface to commission a set of said measurement data from said mobile phone network, wherein said measurement data is selectively commissioned response to said mismatch identification data;
   a measurement data analysis system to receive and analyse said commissioned measurement data, to determine a probable cause of said mismatch, and to provide analysis data identifying said probable cause; and
   an action determination system coupled to said third interface to receive said analysis data and to output to said third interface action data dependent on said analysis data, said action data identifying one or more configuration changes to be made to said mobile phone network to reduce said mismatch.

2. A mobile phone network optimisation system as claimed in claim 1 wherein said performance monitoring system and said measurement data request system each comprise a rules engine.

3. A mobile phone network optimisation system as claimed in claim 2 wherein said rules engine comprises a shared rules engine able both to identify a said mismatch and to identify measurement data for commissioning in response to said mismatch.

4. A mobile phone network optimisation system as claimed in claim 1 further comprising a controller coupled to at least said measurement data request system, to said measurement data analysis system, and to said action determination system, and wherein said controller is configured to determine whether said one or more configuration changes reduces said mismatch and responsive to said determination to control said mobile phone network optimisation system to make one or more further configuration changes to said mobile phone network.

5. A mobile phone network optimisation system as claimed in claim 4 wherein said action determination system is able to determine a plurality of said configuration changes to reduce said mismatch, and wherein said controller is configured to implement a plurality of said configuration changes and to select a said configuration change which best reduces said mismatch.

6. A mobile phone network optimisation system as claimed in claim 1 wherein said measurement data request system is configured to provide request data to said second interface identifying one or more parameters to measure, a location within said network to which said measurement data is to relate, and information defining a number of mobile devices to which said measurement data is to relate, and wherein said set of measurement data commissioned from said mobile phone network comprises said one or more parameters to measure for said location.

7. A mobile phone network as claimed in claim 1 wherein said action determination system comprises a fourth interface to an automatic optimisation system to send said set of measurement data and said mismatch identification data to an automatic mobile phone network parameter optimisation system and to receive mobile phone network parameter data from said automatic optimisation system and wherein said configuration data is derived from said mobile phone network parameter data.

8. A mobile phone network optimisation system as claimed in claim 1, wherein said action determination system comprises a fourth interface said fourth interface including an interface to an engineer to provide some or all of said set of measurement data to said engineer and to receive from said engineer network configuration information defining said configuration data.

9. A mobile phone network optimisation system as claimed in claim 1 wherein said third interface system comprise an interface which enables said configuration of said mobile phone network to be changed without manual intervention, such that said mobile phone network optimisation system is able automatically to optimise at least part of said mobile phone network.

10. A mobile phone network optimisation system as claimed in claim 9 wherein said mismatch defines a fault in said mobile phone network, and wherein said mobile phone network optimisation system is configured automatically to correct said fault by changing said configuration of said network.

11. A mobile phone network optimisation system as claimed in claim 1 wherein said measurement data comprises call trace data.

12. A mobile phone network optimisation system as claimed in claim 1 further comprising a network controller user interface configured to enable a controller of said mobile phone network optimisation system to define one or more network management goals for said mobile phone network, a said network management goal defining a plurality of said performance goals, and wherein said mobile phone network optimisation system is configured to optimise said performance of said mobile phone network towards said network management goal by optimising said performance towards said plurality of performance goals.

* * * * *